United States Patent
Okoshi

(10) Patent No.: US 6,757,598 B2
(45) Date of Patent: Jun. 29, 2004

(54) HYBRID TYPE VEHICLE DRIVE CONTROL APPARATUS, HYBRID TYPE VEHICLE DRIVE CONTROL METHOD, AND PROGRAM THEREOF

(75) Inventor: Toshio Okoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 4 days.

(21) Appl. No.: 10/207,085

(22) Filed: Jul. 30, 2002

(65) Prior Publication Data

US 2003/0033060 A1 Feb. 13, 2003

(30) Foreign Application Priority Data

Aug. 1, 2001 (JP) ........................................ 2001-233098

(51) Int. Cl.$^7$ ................................................ B60K 6/04
(52) U.S. Cl. ...................... 701/22; 180/65.1; 180/65.4; 180/65.8; 320/137
(58) Field of Search ............................ 701/22; 180/65.1, 180/65.2, 65.3, 65.4, 65.8; 320/137

(56) References Cited

U.S. PATENT DOCUMENTS

| | | | | |
|---|---|---|---|---|
| 4,536,697 A | * | 8/1985 | Johnston et al. ............... 322/14 |
| 5,343,970 A | * | 9/1994 | Severinsky ................ 180/65.2 |
| 5,550,445 A | * | 8/1996 | Nii .............................. 318/153 |
| 5,608,310 A | * | 3/1997 | Watanabe ..................... 322/29 |
| 5,713,425 A | * | 2/1998 | Buschhaus et al. ......... 180/65.2 |
| 5,939,861 A | * | 8/1999 | Joko et al. ................... 320/122 |
| 5,945,808 A | * | 8/1999 | Kikuchi et al. .............. 320/132 |
| 5,969,624 A | * | 10/1999 | Sakai et al. ............... 340/636.1 |
| 6,018,694 A | | 1/2000 | Egami et al. |
| 6,118,237 A | * | 9/2000 | Kikuchi et al. .............. 318/139 |
| 6,223,106 B1 | * | 4/2001 | Yano et al. ..................... 701/22 |
| 6,318,487 B2 | * | 11/2001 | Yanase et al. .............. 180/65.2 |

FOREIGN PATENT DOCUMENTS

| | | |
|---|---|---|
| JP | A 61-262006 | 11/1986 |
| JP | A 5-130709 | 5/1993 |
| JP | A 10-243503 | 9/1998 |

OTHER PUBLICATIONS

U.S. patent application Ser. No. 10207,101, Hisada et al., filed Jul. 30, 2002.

* cited by examiner

Primary Examiner—William A. Cuchlinski, Jr.
Assistant Examiner—Eric M Gibson
(74) Attorney, Agent, or Firm—Oliff & Berridge, PLC

(57) ABSTRACT

A hybrid type vehicle drive control apparatus having a generator; a generator inverter for driving the generator; a drive motor; a drive motor inverter for driving the drive motor; a battery connected to the generator inverter and the drive motor inverter; a first voltage detection device that detects a voltage applied to the generator inverter; a second voltage detection device that detects a voltage applied to the drive motor inverter; a third voltage detection device that detects a battery voltage; and a system voltage determination processing means for determining a system voltage based on detection results provided by the first to third voltage detection devices.

17 Claims, 19 Drawing Sheets

HYBRID TYPE VEHICLE DRIVE CONTROL APPARATUS, HYBRID TYPE VEHICLE DRIVE CONTROL METHOD, AND PROGRAM THEREOF

BACKGROUND OF THE INVENTION

1. Field of the Invention

The invention relates to a hybrid type vehicle drive control apparatus, a hybrid type vehicle drive control method, and a program thereof.

2. Description of the Related Art

In a conventional hybrid type vehicle drive apparatus installed in a hybrid type vehicle in which a torque of an engine, that is, a portion of the engine torque, is transferred to an electric generator (generator-motor), and the remainder of the engine torque is transferred to driving wheels, a planetary gear unit is provided that includes a sun gear, a ring gear and a carrier. The carrier is connected to the engine, the ring gear is connected to the drive wheels, and the sun gear is connected to the generator. In such drive apparatus, rotation output from the ring gear and a drive motor is transferred to the drive wheels so as to produce a drive force.

In the aforementioned hybrid type vehicle drive apparatus, a generator rotation speed control is performed so as to adjust the rotation speed of the engine while a torque control is being performed so that a predetermined engine torque is produced, for example, after the engine has been started. In the generator rotation speed control, the torque of the generator, that is, the generator torque, is controlled based on the rotation speed of the generator, that is, a difference between a target generator rotation speed that represents a target value of the generator rotation speed and an actual generator rotation speed, that is, the difference rotation speed.

However, in the hybrid type vehicle drive apparatus, a battery voltage sensor is disposed for detecting the voltage of a battery, that is, the battery voltage, as voltage information, and various drive controls, including a torque control of the generator, a rotation speed control of the generator, a torque control of the drive motor, etc., are performed based on the battery voltage. For example, if the battery voltage becomes high in a case where a hybrid type vehicle is run on a long continuous downhill or the like, the load on an inverter for driving the generator becomes great. Therefore, if the battery voltage is high, the generator torque is restricted.

However, if a detection abnormality occurs in the battery voltage sensor in the aforementioned conventional hybrid type vehicle drive apparatus, it becomes very difficult or even impossible to accurately detect the battery voltage, so that the drive control cannot be smoothly performed.

SUMMARY OF THE INVENTION

A hybrid type vehicle drive control apparatus in accordance with the invention includes an electric generator that generates an electric power by driving an engine; an electric generator inverter for driving the electric generator; a drive motor that drives a hybrid type vehicle; a drive motor inverter for driving the drive motor; a battery connected to the electric generator inverter and the drive motor inverter; first voltage detection means for detecting a voltage applied to the electric generator inverter; second voltage detection means for detecting a voltage applied to the drive motor inverter; third voltage detection means for detecting a battery voltage; and system voltage determination processing means for determining a system voltage based on detection results provided by the first to third voltage detection means.

Another hybrid type vehicle drive control apparatus in accordance with the invention includes a system voltage determination processing means that determines the system voltage based on a difference between two detection results of the detection results provided by the first to third voltage detection means.

Another hybrid type vehicle drive control apparatus in accordance with the invention includes a system voltage determination processing means that determines the system voltage based on the detection result provided by each of the first to third voltage detection means.

A further hybrid type vehicle drive control apparatus in accordance with the invention includes a system voltage determination processing means that determines the system voltage based on detection results provided by two of the first to third voltage detection means, and a detection result provided by another one of the first to third voltage detection means.

A still further hybrid type vehicle drive control apparatus in accordance with the invention further includes a planetary gear unit having at least first to third gear elements, the first gear element is mechanically connected to the electric generator, and the second gear element is mechanically connected to the drive motor, and the third gear element is mechanically connected to the engine.

A hybrid type vehicle drive control method in accordance with the invention is applicable to a hybrid type vehicle drive apparatus that includes an electric generator that generates an electric power by driving an engine; an electric generator inverter for driving the electric generator; a drive motor that drives a hybrid type vehicle; and a drive motor inverter for driving the drive motor; and a battery connected to the electric generator inverter and the drive motor inverter.

In this method, a voltage applied to the electric generator inverter is detected by first voltage detection means, a voltage applied to the drive motor inverter is detected by second voltage detection means, and a battery voltage is detected by third voltage detection means. A system voltage is determined based on detection results provided by the first to third voltage detection means.

A program of a hybrid type vehicle drive control method in accordance with the invention causes a computer to function as first voltage detection means for detecting a voltage applied to an electric generator inverter; second voltage detection means for detecting a voltage applied to a drive motor inverter; third voltage detection means for detecting a battery voltage; and system voltage determination processing means for determining a system voltage based on detection results provided by the first to third voltage detection means.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Embodiments of the invention will be described in detail hereinafter with reference to the drawings.

Figure 1:
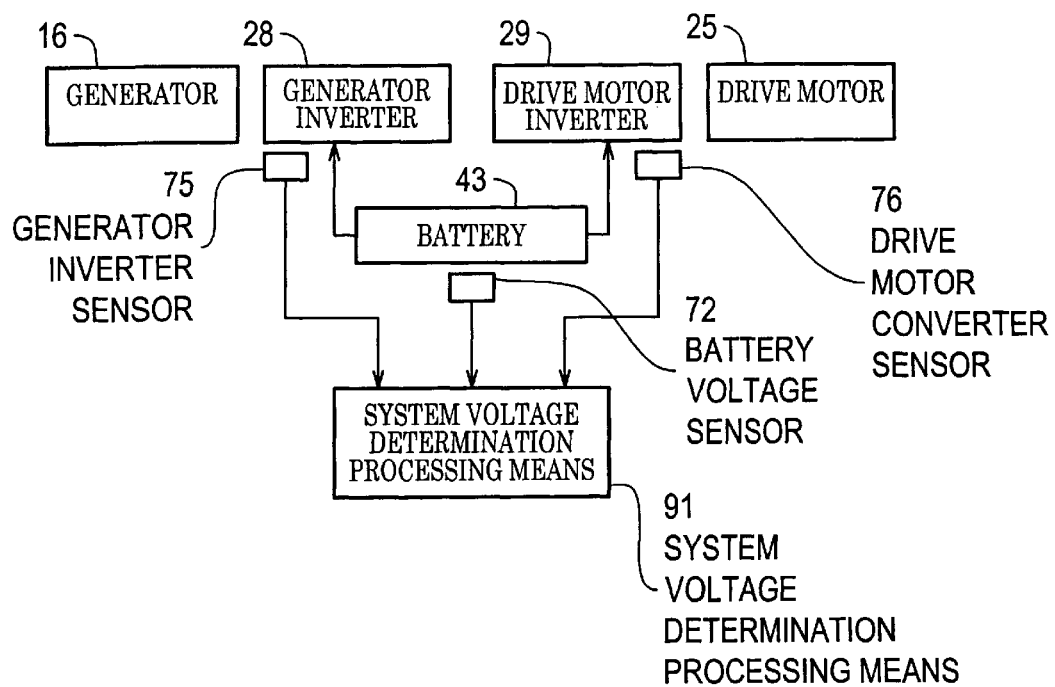
FIG. 1 is a functional block diagram of a hybrid type vehicle drive control apparatus in a first embodiment of the invention.

FIG. 1 is a function block diagram of a hybrid type vehicle drive control apparatus in accordance with a first embodiment of the invention.

Shown in FIG. 1 are a generator 16 for generating electric power by driving an engine (not shown); an inverter 28 as a generator inverter for driving the generator 16; a drive motor 25 that drives a hybrid type vehicle; an inverter 29 as a drive motor inverter for driving the drive motor 25; a battery 43 connected to the inverters 28, 29; a first voltage detection means 75, such as, for example, generator inverter sensor 75, to detect the voltage applied to the generator inverter; a second voltage detection means 76, such as, for example, drive motor inverter sensor 76, to detect the voltage applied to the drive motor inverter; a third voltage detection means 72, such as for example, battery voltage sensor 72, to detect the battery voltage; and a system voltage determination processing means 91 for determining a system voltage based on results of detection by the generator inverter sensor 75, the drive motor inverter sensor 76 and the battery voltage sensor 72.

Figure 2:
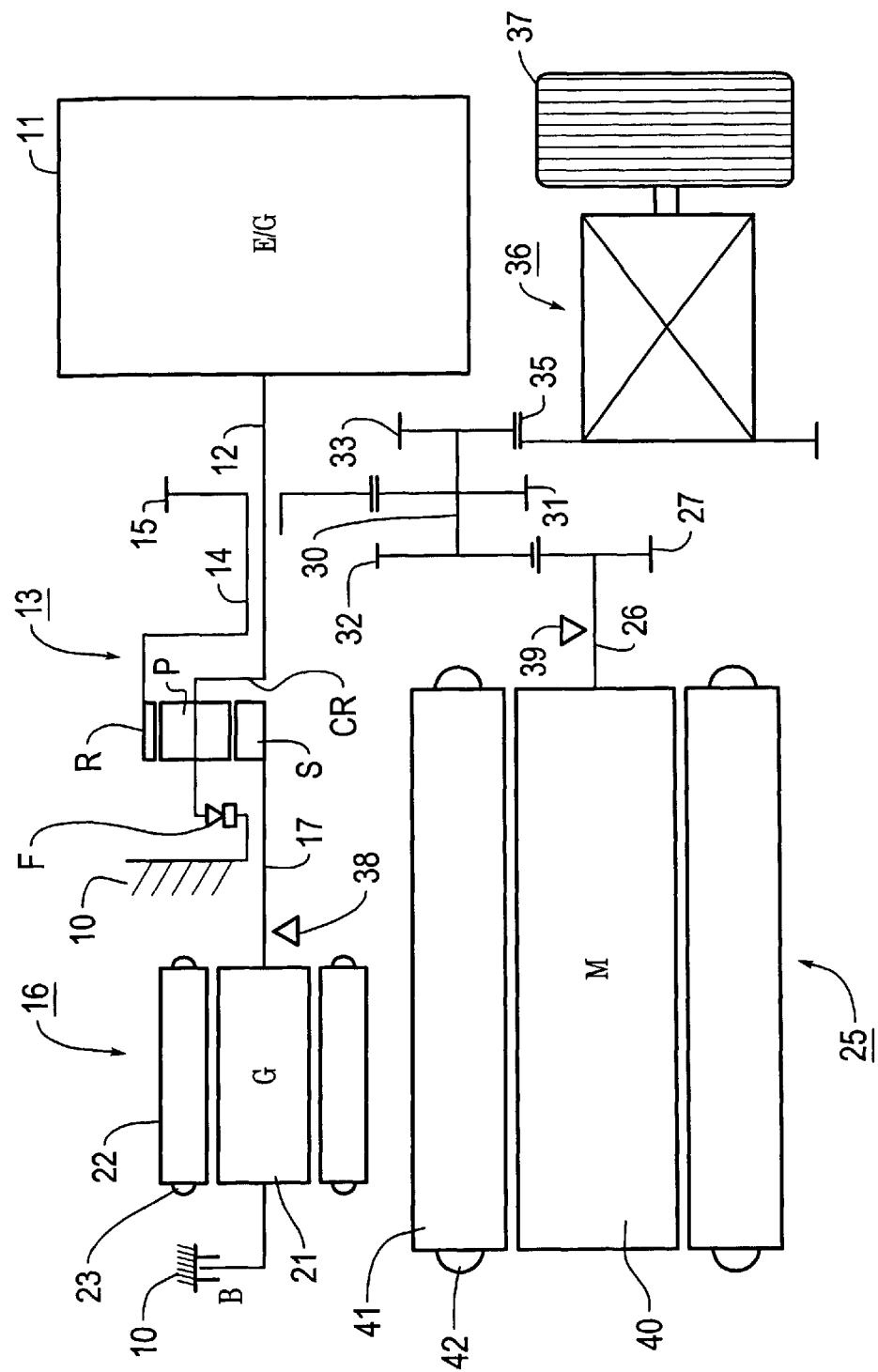
FIG. 2 is a schematic diagram of a hybrid type vehicle in the first embodiment of the invention.

FIG. 2 is a schematic diagram of a hybrid type vehicle in accordance with the first embodiment of the invention. Shown in FIG. 2 are an engine (E/G) 11 disposed on a first axis; an output shaft 12 that is disposed on the first axis and that outputs rotation provided by driving the engine 11; a planetary gear unit 13 as a differential gear device that is disposed on the first axis and that changes the speed of rotation input via the output shaft 12; an output shaft 14 that is disposed on the first axis and that outputs speed-changed rotation from the planetary gear unit 13; a first counter drive gear 15 as an output gear fixed to the output shaft 14; and a generator (G) 16 that is disposed on the first axis, and is connected to the planetary gear unit 13 via a transfer shaft 17, and is mechanically connected to the engine 11 in a fashion allowing differential rotation, and that generates power through the drive of the engine 11.

The output shaft 14 has a sleeve-like shape, and is disposed surrounding the output shaft 12. The first counter drive gear 15 is disposed at an engine 11-side of the planetary gear unit 13.

The planetary gear unit 13 has at least a sun gear S as a first gear element, pinions P meshing with the sun gear S, a ring gear R as a second gear element that meshes with the pinions P, and a carrier CR as a third gear element that rotatably supports the pinions P. The sun gear S is mechanically connected to the generator 16 via the transfer shaft 17. The ring gear R is mechanically connected, via the output shaft 14 and a predetermined gear train, to drive wheels 37 (one shown) and a drive motor (M) 25 as a second electric motor for driving the hybrid type vehicle which are disposed on second axes parallel to the first axis, and which are mechanically connected to the engine 11 and the generator 16 in a fashion allowing differential rotation. The carrier CR is mechanically connected to the engine 11 via the output shaft 12. A one-way clutch F is disposed between the carrier CR and a case 10 of the hybrid type vehicle drive apparatus. The one-way clutch F becomes free when forward rotation of the engine 11 is transferred to the carrier CR. When reverse rotation from the generator 16 or the drive motor 25 is transferred to the carrier CR, the one-way clutch F is locked so as to prevent transfer of the reverse rotation to the engine 11.

Furthermore, the generator 16 is made up of a rotor 21 that is fixed to the transfer shaft 17 and is rotatably disposed, a stator 22 disposed around the rotor 21, and coils 23 wound on the stator 22. The generator 16 generates electric power from rotation transferred thereto via the transfer shaft 17. The coils 23 are connected to a battery (not shown in FIG. 2), and supply DC current to the battery. A generator brake B is disposed between the rotor 21 and the case 10. By engaging the generator brake B, the rotor 21 can be fixed to mechanically stop rotation of the generator 16.

Reference numeral 26 represents an output shaft disposed on the second axis. Via the output shaft 26, rotation of the drive motor 25 is output. Reference numeral 27 represents a second counter drive gear as an output gear fixed to the output shaft 26. The drive motor 25 is made up of a rotor 40 fixed to the output shaft 26 and rotatably disposed, a stator 41 provided around the rotor 40, and coils 42 wound on the stator 41.

The drive motor 25 generates drive motor torque TM from electric current supplied to the coils 42. Therefore, the coils 42 are connected to the battery (not shown in FIG. 2). DC current from the battery is converted into AC current, which is supplied to the coils 42.

In order to rotate the drive wheels 37 in the same rotational direction as the engine 11, a counter shaft 30 is disposed on a third axis parallel to the first and second axes. A first counter driven gear 31, and a second counter driven gear 32 having more teeth than the first counter driven gear 31 are fixed to the counter shaft 30. The first counter driven gear 31 and the first counter drive gear 15 are meshed with each other, and the second counter driven gear 32 and the second counter drive gear 27 are meshed with each other. Therefore, rotation of the first counter drive gear 15 is reversed when transferred to the first counter driven gear 31, and rotation of the second counter drive gear 27 is reversed when transferred to the second counter driven gear 32.

Furthermore, a differential pinion gear 33 having fewer teeth than the first counter driven gear 31 is fixed to the counter shaft 30.

A differential device 36 is disposed on a fourth axis parallel to the first to third axes. A differential ring gear 35 of the differential device 36 is meshed with the differential pinion gear 33. Therefore, rotation transferred to the differential ring gear 35 is distributed and transferred to the drive wheels 37 by the differential device 36. Thus, rotation produced by the engine 11 can be transferred to the first counter driven gear 31. Furthermore, rotation produced by the drive motor 25 can be transferred to the second counter driven gear 32. Therefore, the hybrid type vehicle can be operated by driving the engine 11 and the drive motor 25.

Reference numeral 38 represents a generator rotor position sensor, such as a resolver or the like, for detecting the position of the rotor 21, that is, the generator rotor position θG. Reference numeral 39 represents a drive motor rotor position sensor, such as a resolver or the like, for detecting the position of the rotor 40, that is, the drive motor rotor position θM.

By computing a rate of change ΔθG of the generator rotor position θG, it is possible to compute the generator rotation speed NG. By computing a rate of change ΔθM of the drive motor rotor position ΔM, it is possible to compute the rotation speed of the drive motor 25, that is, the drive motor rotation speed NM. Furthermore, the vehicle speed V can be computed based on the rate of change ΔθM, and the gear ratio γV of a torque transfer system from the output shaft 26 to the drive wheels 37. The generator rotor position θG corresponds to the generator rotation speed NG, and the drive motor rotor position θM corresponds to the drive motor rotation speed NM. Therefore, it is possible to cause the generator rotor position sensor 38 to function as a generator rotation speed detection means for detecting the generator rotation speed NG, and cause the drive motor rotor position sensor 39 to function as a drive motor rotation speed detection means for detecting the drive motor rotation speed NM and as a vehicle speed detection means for detecting the vehicle speed V.

Figure 3:
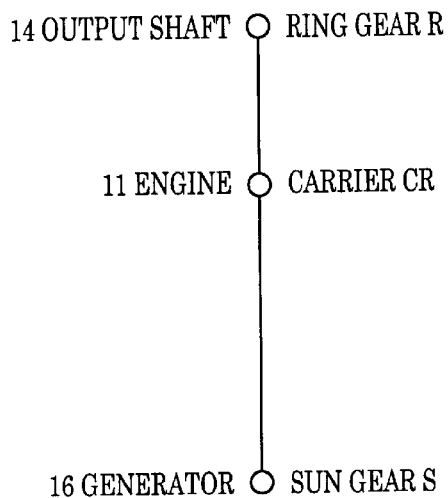
FIG. 3 is a diagram illustrating an operation of a planetary gear unit in the first embodiment of the invention.
Figures 4, 5:
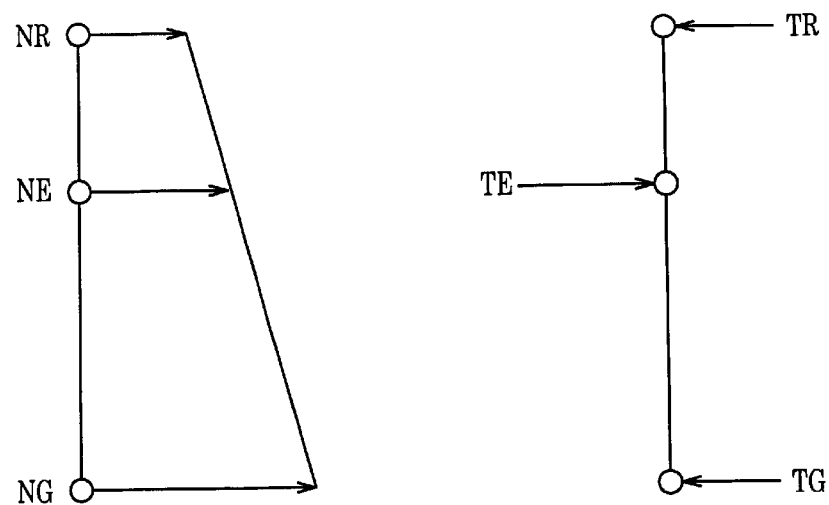
FIG. 4 is a vehicle speed diagram for a normal run in the first embodiment of the invention.
FIG. 5 is a torque diagram for a normal run in the first embodiment of the invention.

Next described will be operation of the planetary gear unit 13. FIG. 3 is a diagram illustrating the operation of the planetary gear unit in accordance with the first embodiment of the invention. FIG. 4 is a vehicle speed diagram for a normal run of the vehicle in accordance with the first embodiment of the invention. FIG. 5 is a torque diagram for a normal run in accordance with the first embodiment of the invention.

As shown in FIGS. 2 and 3, in the planetary gear unit 13 (FIG. 2), the carrier CR is connected to the engine 11, and the sun gear S is connected to the generator 16. Furthermore, the ring gear R is connected to the drive motor 25 and the drive wheels 37 via the output shaft 14. Therefore, the rotation speed of the ring gear R, that is, the ring gear rotation speed NR, equals the rotation speed output to the output shaft 14, that is, the output shaft rotation speed. The rotation speed of the carrier CR equals the rotation speed of the engine 11, that is, the engine rotation speed NE. The rotation speed of the sun gear S equals the generator rotation speed NG. Then, if the number of teeth of the ring gear R is set at ρ times (two times in this embodiment) the number of teeth of the sun gear S, the following relationship holds:

$$(\rho+1)\cdot NE = 1\cdot NG + \rho\cdot NR$$

Therefore, the engine rotation speed NE can be computed from the ring gear rotation speed NR and the generator rotation speed NG as follows:

$$NE-(1\cdot NG+\rho\cdot NR)/(\rho+1) \qquad (1)$$

Equation (1) forms a rotation speed relational expression regarding the planetary gear unit 13.

The engine torque TE, the torque produced on the ring gear R, that is, the ring gear torque TR, and the generator torque TG have the following relationship:

$$TE:TR:TG=(\rho+1):\rho:1 \qquad (2)$$

Thus, the engine, the ring gear R and the generator are affected by reaction forces from one another.

During an ordinary run of the hybrid type vehicle, the ring gear R, the carrier CR and the sun gear S are rotated in a positive direction, and the ring gear rotation speed NR, the engine rotation speed NE and the generator rotation speed NG assume positive values as indicated in FIG. 4. The ring gear torque TR and the generator torque TG are acquired by splitting the engine torque TE at a torque ratio that is determined by the number of teeth of the planetary gear unit 13. Therefore, in the torque diagram of FIG. 5, the engine torque TE is the sum of the ring gear torque TR and the generator torque TG.

Figure 6:
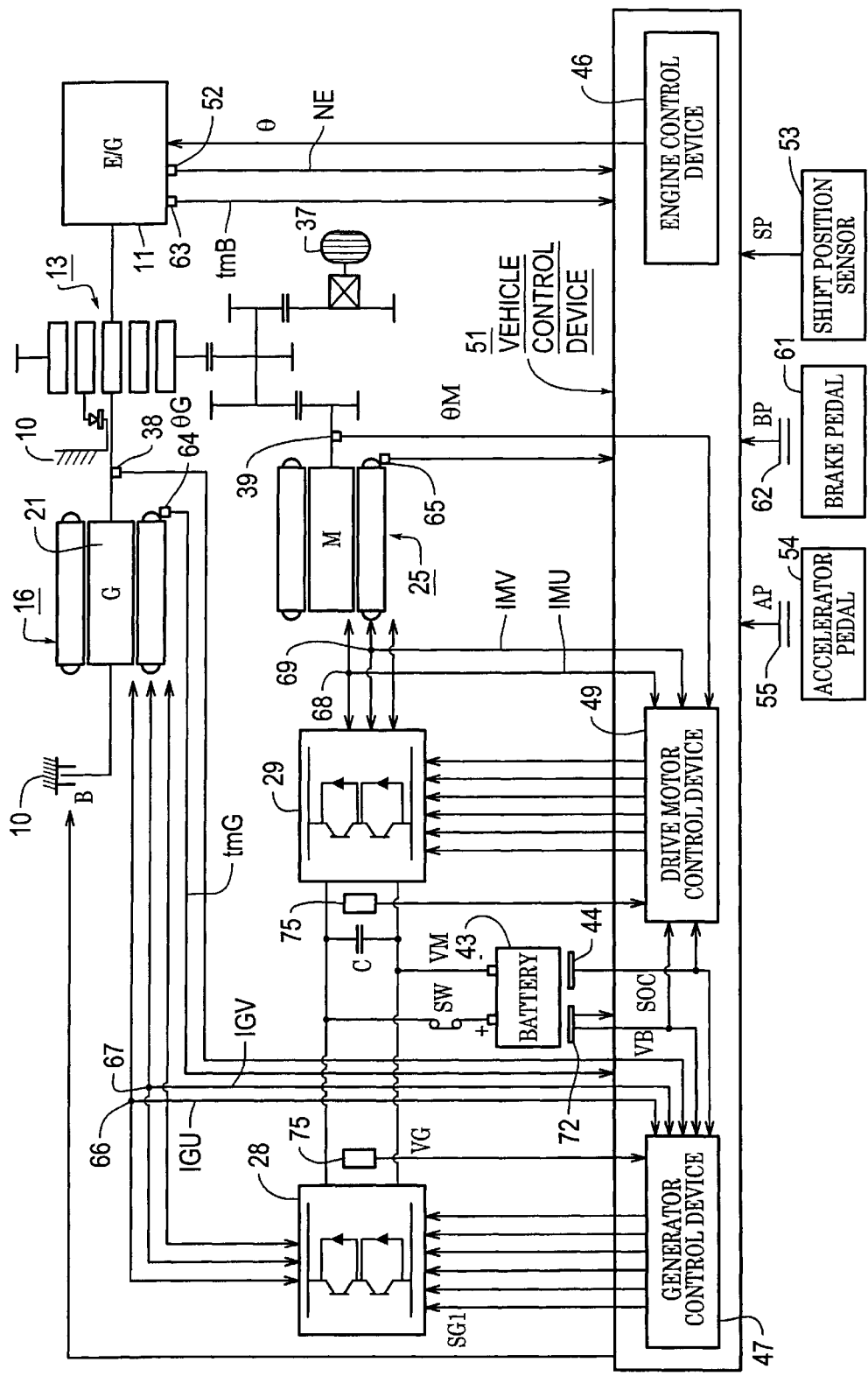
FIG. 6 is a schematic diagram illustrating a hybrid type vehicle drive control apparatus in the first embodiment of the invention.

Next described will be a hybrid type vehicle drive control apparatus and a hybrid type vehicle drive control method for controlling the hybrid type vehicle drive apparatus. FIG. 6 is a conceptual diagram illustrating a hybrid type vehicle drive control apparatus in accordance with the first embodiment of the invention.

FIG. 6 shows a case 10; an engine 11 (E/G); a planetary gear unit 13; a generator (G) 16; a generator brake B for fixing a rotor 21 of the generator 16; a drive motor (M) 25; an inverter 28 as a generator inverter for driving the generator 16; an inverter 29 as a drive motor inverter for driving the drive motor 25; drive wheels 37 (one shown); a generator rotor position sensor 38; a drive motor rotor position sensor 39; and a battery 43. The inverters 28, 29 are connected to the battery 43 via a power supply switch SW. When the power supply switch SW is on, the battery 43 sends DC current to the inverters 28, 29. Disposed at an input side of the inverter 28 is a generator inverter sensor 75 as a first voltage detection means for detecting the DC voltage applied to the inverter 28, that is, the generator inverter voltage VG. Disposed at an input side of the inverter 29 is a drive motor inverter sensor 76 as a second voltage detection means for detecting the DC voltage applied to the inverter 29, that is, the drive motor inverter voltage VM. The generator inverter voltage VG and the drive motor inverter voltage VM are sent to a generator control device 47 and a drive motor control device 49, respectively. A smoothing capacitor C is connected between the battery 43 and the inverter 29.

A vehicle control device 51 is a computer that is made up of a CPU (not shown), a recording device, etc., and that performs overall control of the hybrid type vehicle. The vehicle control device 51 includes an engine control device 46, a generator control device 47, and a drive motor control device 49. The engine control device 46 is made up of a CPU (not shown), a recording device, etc., and sends instruction signals regarding the degree of throttle opening θ, the valve timing, etc., to the engine 11 in order to control the engine 11. The generator control device 47 is made up of a CPU (not shown), a recording device, etc., and sends a drive signal SG1 to the inverter 28 in order to control the generator 16. The drive motor control device 49 is made up of a CPU (not shown), a recording device, etc., and sends a drive signal SG2 to the inverter 29 in order to control the drive motor 25.

The generator inverter 28 is driven in accordance with the drive signal SG1. At the time of powering (driving), the inverter 28 receives DC current from the battery 43, and generates phase currents, that is, currents IGU, IGV, IGW of a U-phase, a V-phase and a W-phase, and sends the currents IGU, IGV, IGW of the phases to the generator 16. At the time of regeneration (electric power generation), the inverter 28 receives the currents IGU, IGV, IGW, and generates DC currents, and sends the currents to the battery 43.

The drive motor inverter 29 is driven in accordance with the drive signal SG2. At the time of powering, the inverter 29 receives DC current from the battery 43, and generates currents IMU, IMV, IMW of a U-phase, a V-phase and a W-phase, and sends the currents IMU, IMV, IMW of the phases to the drive motor 25. At the time of regeneration, the inverter 29 receives the currents IMU, IMV, IMW, and generates DC currents, and sends the currents to the battery 43.

Further shown are a battery remaining amount detecting device 44 that detects a battery remaining amount SOC as the state of the battery 43, that is, the battery state; an engine rotation speed sensor 52 that detects the engine rotation speed NE; a shift position sensor 53 as a speed selection operating means for detecting the position of a shift lever (not shown), that is, the shift position SP; an accelerator pedal 54; an accelerator switch 55 as an accelerator operation detection means for detecting the position (amount of depression) of the accelerator pedal 54, that is, the accelerator pedal position AP; a brake pedal 61; a brake switch 62 as a brake operation detection means for detecting the position (amount of depression) of the brake pedal 61, that is, the brake pedal position BP; an engine temperature sensor 63 that detects the temperature tmE of the engine 11; a generator temperature sensor 64 that detects the temperature of the generator 16, for example, the temperature tmG of the coils 23 (FIG. 2); and a drive motor temperature sensor 65 that detects the temperature of the drive motor 25, for example, the temperature of the coils 42.

Still further shown are current sensors 66 to 69 that detects the currents IGU, IGV, IMU, IMV, respectively, and a battery voltage sensor 72 as a third voltage detection means for detecting the battery voltage VB as the battery state. The battery voltage VB is sent to the generator control device 47, the drive motor control device 49 and the vehicle control device 51. As a battery state, it is possible to detect battery current, battery temperature, etc. Battery state detection means is formed by the battery remaining amount detecting device 44, the battery voltage sensor 72, a battery current sensor (not shown), a battery temperature sensor (not shown), etc. The battery voltage VB, the generator inverter voltage VG and the drive motor inverter voltage VM form the first to third voltage information pieces.

The vehicle control device 51 sets the driving and stopping of the engine 11 by sending an engine control signal to the engine control device 46, computes the generator rotation speed NG by reading the generator rotor position θG, computes the drive motor rotation speed NM by reading the drive motor rotor position θM, computes the engine rotation speed NE using the rotation speed relational expression, sets in the engine control device 46 a target engine rotation speed NE* that represents a target value of the engine rotation speed NE, sets in the generator control device 47 a target generator rotation speed NG* that represents a target value of the generator rotation speed NG, and a target generator torque TG* that represents a target value of the generator torque TG, and sets in the drive motor control device 49 a target drive motor torque TM* that represents a target value of the drive motor torque TM, and a drive motor torque corrected value δTM that represents a corrected value of the drive motor torque TM.

Therefore, a generator rotation speed computation processing means (not separately shown) of the vehicle control device 51 reads the generator rotor position θG, and computes the generator rotation speed NG. A drive motor rotation speed computation processing means (not separately shown) of the vehicle control device 51 reads the drive motor rotor position θM, and computes the drive motor rotation speed NM. A engine rotation speed computation processing means (not separately shown) of the vehicle control device 51 computes the engine rotation speed NE using the rotation speed relational expression. The generator rotation speed computation processing means, the drive motor rotation speed computation processing means, and the engine rotation speed computation processing means function as the generator rotation speed detection means, the drive motor rotation speed detection means, and the engine rotation speed detection means for detecting the generator rotation speed NG, the drive motor rotation speed NM, and the engine rotation speed NE.

Although in this embodiment, the engine rotation speed NE is computed by the vehicle control device 51, it is also possible to read the engine rotation speed NE from the engine rotation speed sensor 52. Furthermore, although in the embodiment, the vehicle speed V is computed from the drive motor rotor position θM, it is also possible to compute the vehicle speed V from the ring gear rotation speed NR, or compute the vehicle speed V from the rotation speed of the drive wheels 37, that is, the drive wheel rotation speed. In that case, a ring gear rotation speed sensor, a drive wheel rotation speed sensor, etc., may be provided as vehicle speed detection means.

Figure 7:
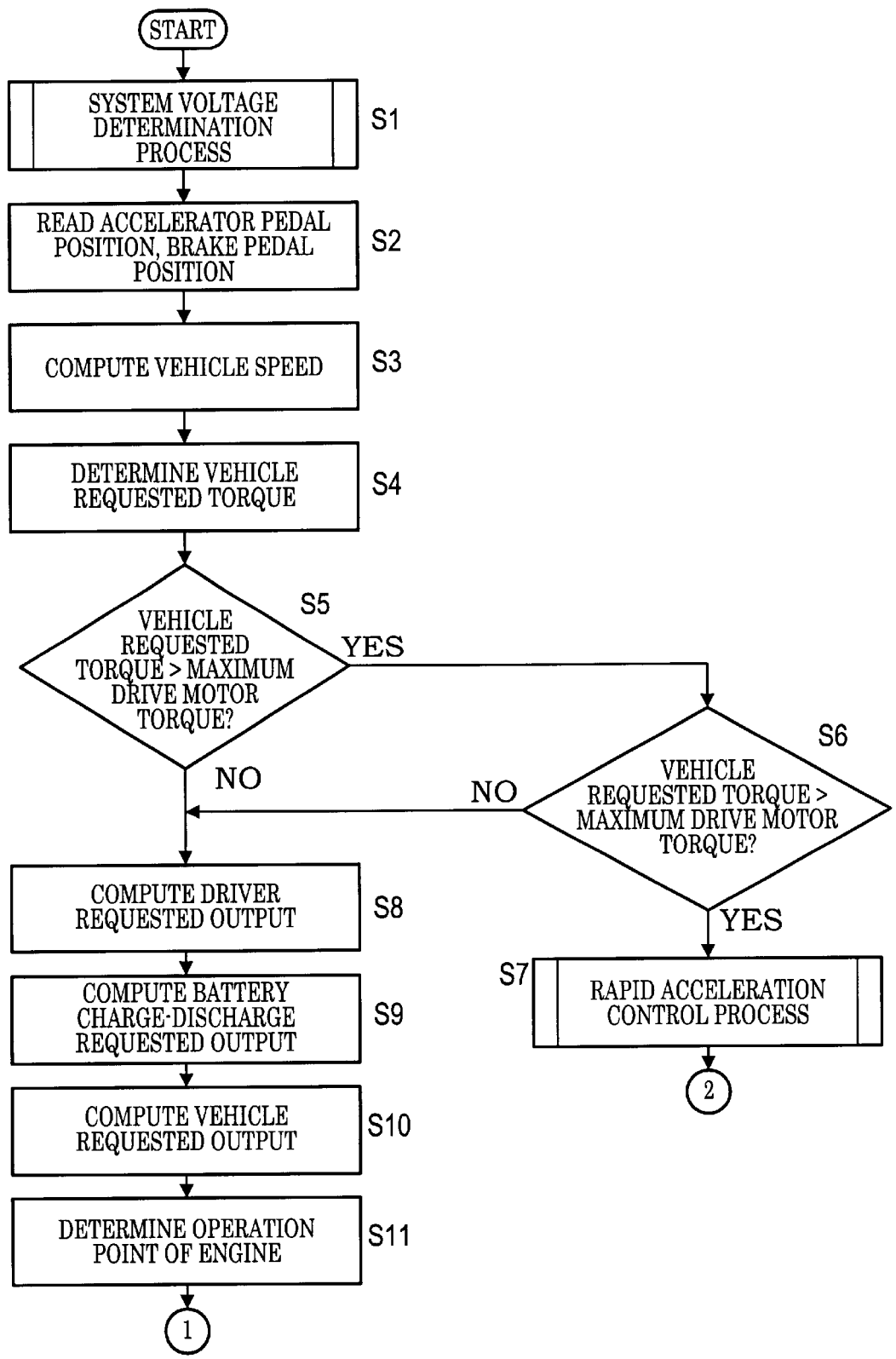
FIG. 7 is a first main flowchart illustrating an operation of the hybrid type vehicle drive control apparatus in the first embodiment of the invention.
Figure 8:
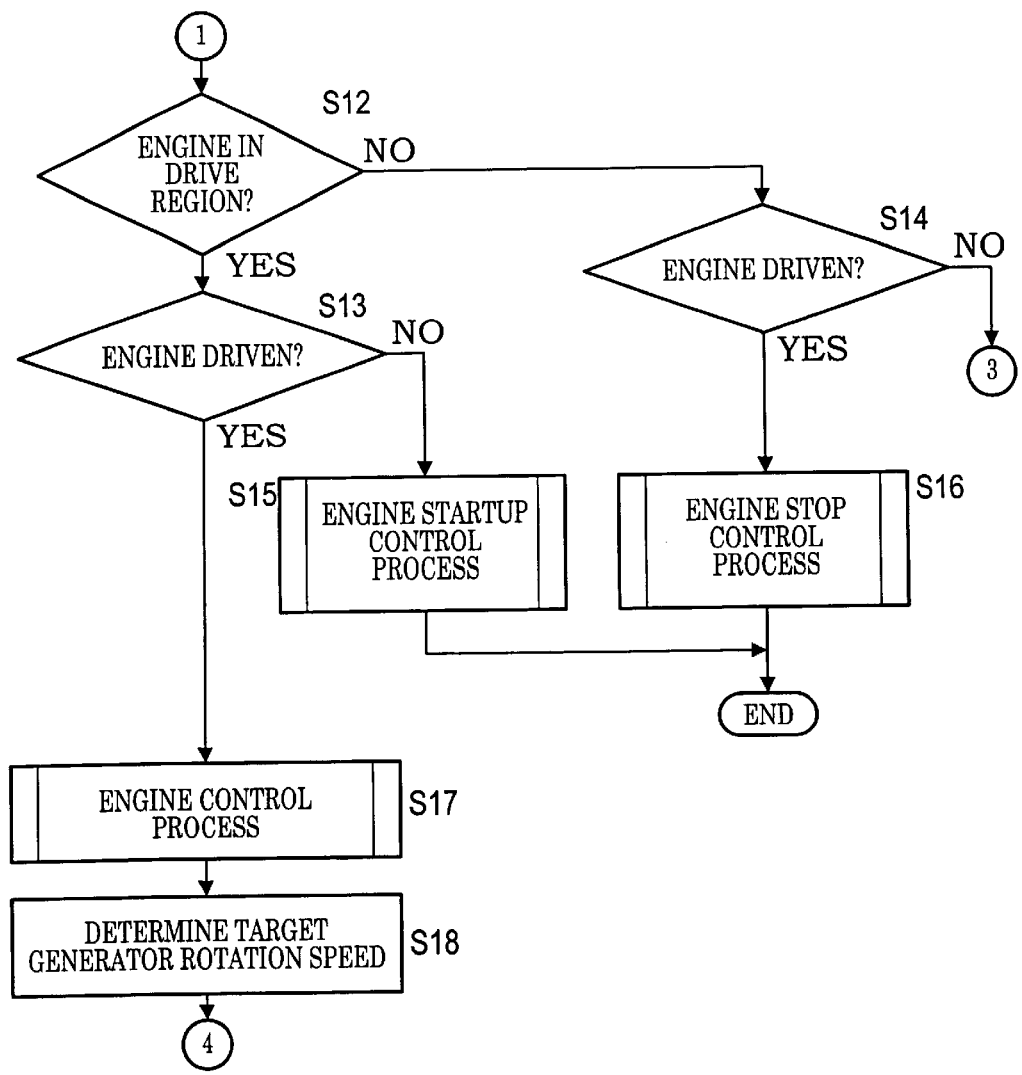
FIG. 8 is a second main flowchart illustrating an operation of the hybrid type vehicle drive control apparatus in the first embodiment of the invention.
Figure 9:
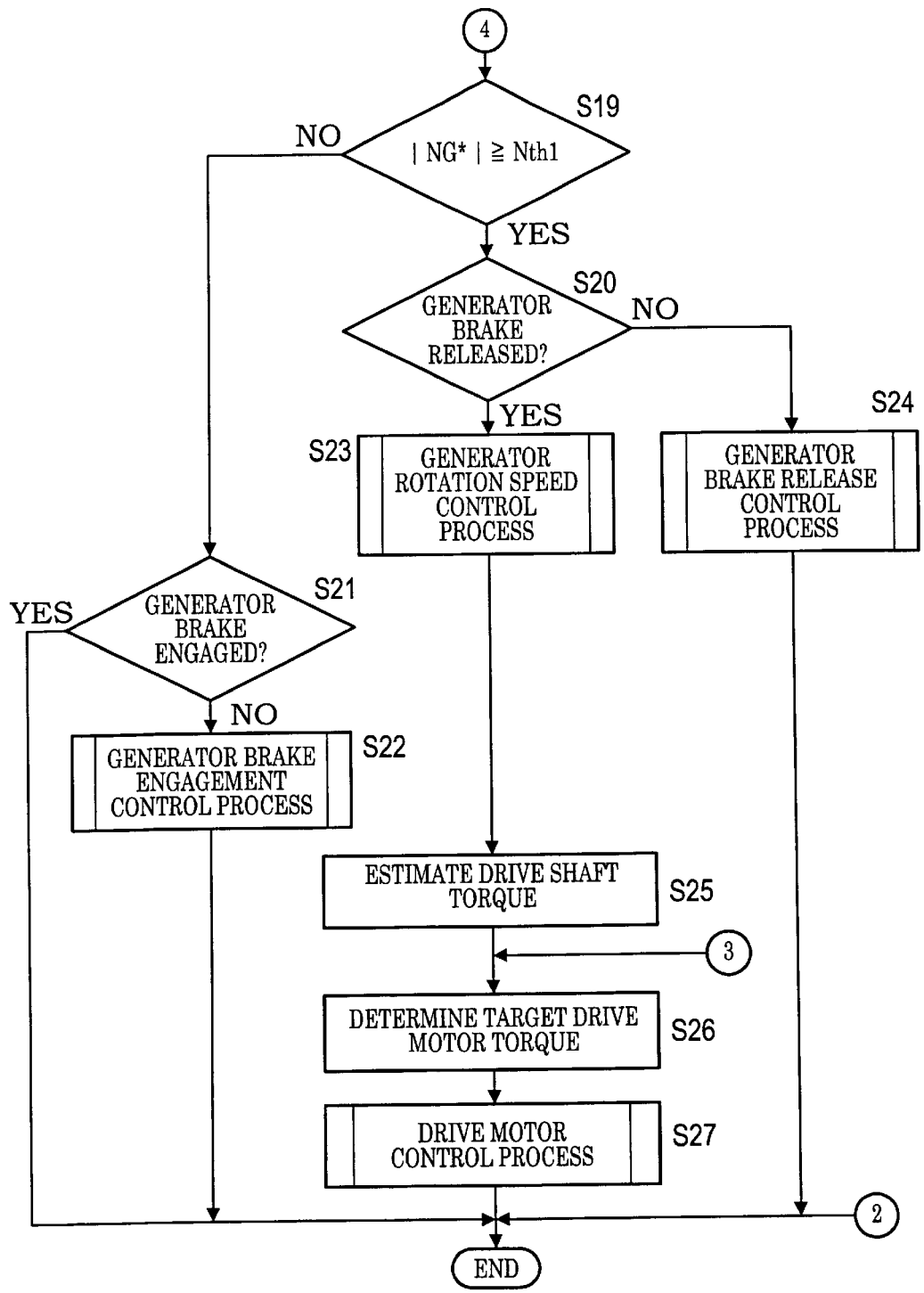
FIG. 9 is a third main flowchart illustrating an operation of the hybrid type vehicle drive control apparatus in the first embodiment of the invention.
Figure 10:
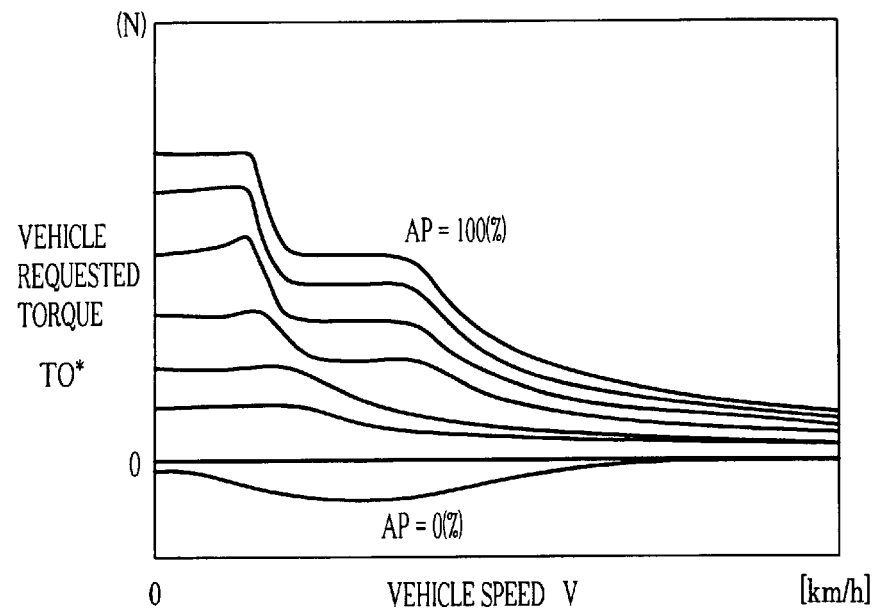
FIG. 10 is a diagram indicating a first vehicle-requested torque map in the first embodiment of the invention.
Figure 11:
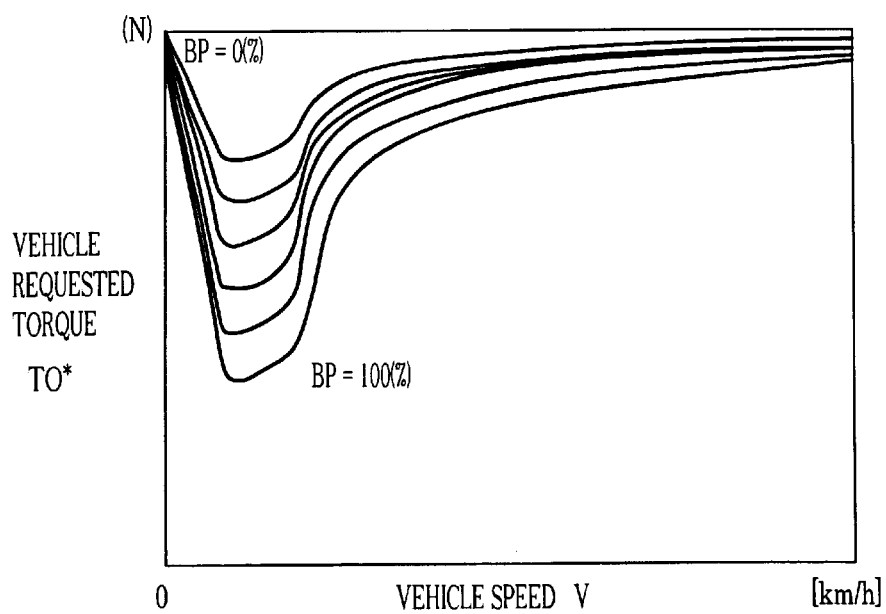
FIG. 11 is a diagram indicating a second vehicle-requested torque map in the first embodiment of the invention.
Figure 12:
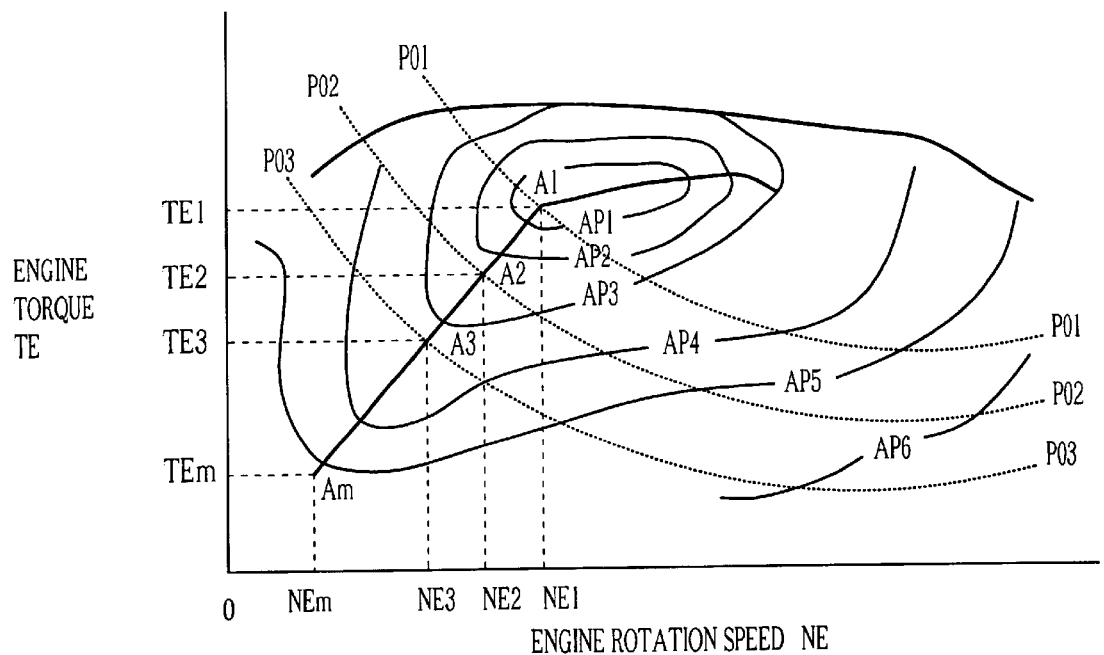
FIG. 12 is a diagram illustrating a target engine operation state map in the first embodiment of the invention.
Figure 13:
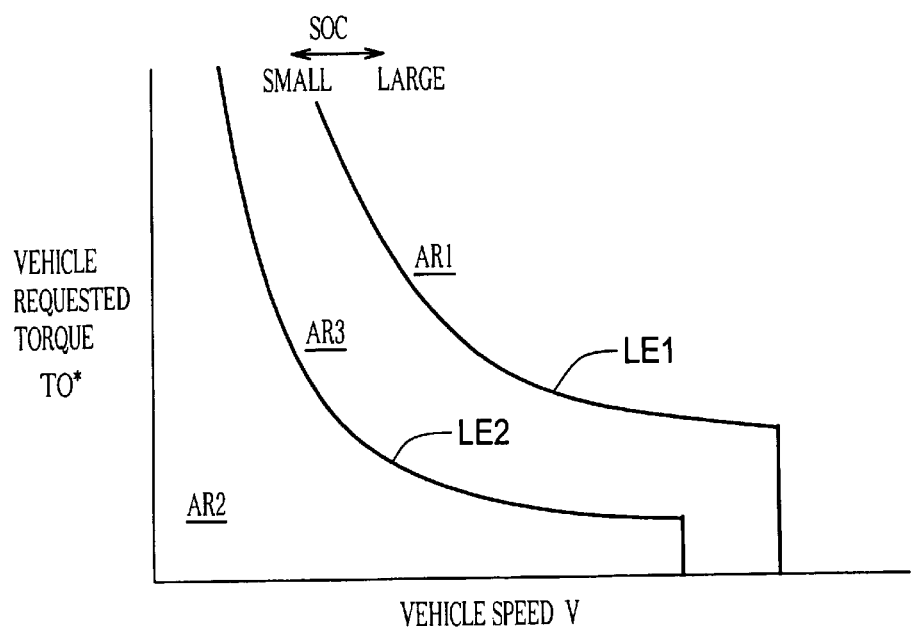
FIG. 13 is a diagram indicating an engine drive region map in the first embodiment of the invention.

Next described will be operation of the hybrid type vehicle drive control apparatus constructed as described above. FIG. 7 is a first main flowchart illustrating an operation of the hybrid type vehicle drive control apparatus in the first embodiment of the invention. FIG. 8 is a second main flowchart illustrating an operation of the hybrid type vehicle drive control apparatus in the first embodiment of the invention. FIG. 9 is a third main flowchart illustrating an operation of the hybrid type vehicle drive control apparatus in the first embodiment of the invention. FIG. 10 is a diagram indicating a first vehicle-requested torque map in the first embodiment of the invention. FIG. 11 is a diagram indicating a second vehicle-requested torque map in the first embodiment of the invention. FIG. 12 is a diagram illustrating a target engine operation state map in the first embodiment of the invention. FIG. 13 is a diagram indicating an engine drive region map in the first embodiment of the invention. In FIGS. 10, 11 and 13, the horizontal axis indicates the vehicle speed V, and the vertical axis indicates the vehicle-requested torque TO*. In FIG. 12, the horizontal axis indicates the engine rotation speed NE, and the vertical axis indicates the engine torque TE.

First, the system voltage determination processing means 91 (FIG. 1) of the vehicle control device 51 (FIG. 6) performs a system voltage determining process to determine a system voltage Vsys based on the battery voltage VB, the generator inverter voltage VG and the drive motor inverter voltage VM. Next, the vehicle-requested torque determination processing means (not separately shown) of the vehicle control device 51 performs a vehicle-requested torque determining process. That is, the vehicle-requested torque determination processing means reads the accelerator pedal position AP from the accelerator switch 55, and the brake pedal position BP from the brake switch 62, and reads the drive motor rotor position θM from the drive motor rotor position sensor 39, and computes the vehicle speed V. The means determines a vehicle-requested torque TO* needed to run the hybrid type vehicle which is pre-set corresponding to the accelerator pedal position AP, the brake pedal position BP and the vehicle speed V, by referring to the first vehicle-requested torque map of FIG. 10 recorded in a recording device of the vehicle control device 51 if the accelerator pedal 54 is depressed, and by referring to the second vehicle-requested torque map of FIG. 11 recorded in the recording device if the brake pedal 61 is depressed.

Subsequently, the vehicle control device 51 determines whether the vehicle-requested torque TO* is greater than a maximum drive motor torque TMmax that is pre-set as a rated torque of the drive motor 25. If the vehicle-requested torque TO* is greater than the maximum drive motor torque TMmax, the vehicle control device 51 determines whether the engine 11 is at a stop. If the engine 11 is at a stop, a rapid acceleration control processing means (not separately shown) of the vehicle control device 51 performs a rapid acceleration control process, in which the means drives the drive motor 25 and the generator 16 to run the hybrid type vehicle.

If the vehicle-requested torque TO* is not greater than the maximum drive motor torque TMmax, or if the vehicle-requested torque TO* is greater than the maximum drive motor torque TMmax and the engine 11 is in operation, a driver-requested output computation processing means (not separately shown) of the vehicle control device 51 performs a driver-requested output computing process, in which the vehicle-requested torque TO* is multiplied by the vehicle speed V to determine a driver-requested output PD:

$$PD=TO^* \cdot V$$

Next, a battery charge-discharge requested output computation processing means (not separately shown) of the vehicle control device 51 performs a battery charge-discharge requested output computing process, in which the battery remaining amount SOC is read from the battery remaining amount detecting device 44, and a battery charge-discharge requested output PB is computed from the battery remaining amount SOC.

Subsequently, a vehicle-requested output computation processing means (not separately shown) of the vehicle control device 51 performs a vehicle-requested output computing process, in which the predetermined drive-requested output PD is added to the battery charge-discharge requested output PB to determine a vehicle-requested output PO:

$$PO=PD+PB$$

Subsequently, a target engine operation state setting processing means (not separately shown) of the vehicle control device 51 performs a target engine operation state setting process. That is, referring to the target engine operation state map of FIG. 12 recorded in the recording device, the target engine operation state setting processing means determines points A1 to A3, Am of intersection of lines PO1 to PO3 indicating the vehicle-requested output PO with an optimal fuel economy curve L where the efficiency of the engine 11 becomes highest at each of the accelerator pedal positions AP1 to AP6, as operation points of the engine 11 indicating the target engine operation state. The engine torque TE1 to TE3, TEm at the operation point is determined as a target engine torque TE*. The engine rotation speed NE1 to NE3 at the operation point is determined as a target engine rotation speed NE*.

Then, the vehicle control device 51 determines whether the engine 11 is in a drive region AR1, by referring to the engine drive region map of FIG. 13 recorded in the recording device. In FIG. 13, AR1 represents a drive region in which the engine 11 is driven, and AR2 represents a stop region in which the driving of the engine 11 is stopped, and AR3 represents a hysteresis region. Furthermore, LE1 represents a line on which the engine 11 in a stopped state is driven, and LE2 represents a line on which the engine 11 in a driven state is stopped being driven. As the battery remaining amount SOC increases, the line LE1 is shifted rightward in FIG. 13 so as to reduce the driven region AR1. As the battery remaining amount SOC decreases, the line LE1 is shifted leftward in FIG. 13 so as to increase the drive region AR1.

If the engine 11 is not driven although the engine 11 is in the drive region AR1, a engine startup control processing means (not separately shown) of the vehicle control device 51 performs an engine startup control process to start up the engine 11. If the engine 11 is driven although the engine 11 is not in the drive region AR1, an engine stop control processing means (not separately shown) of the vehicle control device 51 performs an engine stop control process to stop the driving of the engine 11. If the engine 11 is not in the drive region AR1 and the engine 11 is at a stop, a target drive motor torque determination processing means (not separately shown) of the vehicle control device 51 performs a target drive motor torque determination process, in which the vehicle-requested torque TO* is determined as a target drive motor torque TM*, and a not-shown drive motor control processing means of the vehicle control device 51 performs a drive motor control process to perform a torque control of the drive motor 25. As a result, the hybrid type vehicle is run in a motor drive mode.

If the engine 11 is in the drive region AR1 and the engine 11 is being driven, an engine control processing means (not separately shown) of the engine control device 46 performs an engine control process, in which the engine 11 is controlled by a predetermined method.

Next, the generator rotation speed computation processing means of the vehicle control device 51 performs the generator rotation speed computation process, in which the drive motor rotor position θM is read, and a ring gear rotation speed NR is computed based on the drive motor rotor position θM and the gear ratio γR of a portion from the output shaft 26 to the ring gear R. The target engine rotation speed NE* determined in the target engine operation state setting process is read, and a target generator rotation speed NG* is computed and determined from the ring gear rotation speed NR and the target engine rotation speed NE* by using the rotation speed relational expression.

If the generator rotation speed NG is low during a run of the hybrid type vehicle in a motor-engine drive mode, the electric power consumption becomes great and the electric power generating efficiency of the generator 16 becomes low, so that the fuel economy of the hybrid type vehicle correspondingly deteriorates. Therefore, the absolute value of the target generator rotation speed NG* is less than a predetermined rotation speed, the generator brake B is engaged to mechanically stop the generator 16. Thus, the fuel economy will improve.

Therefore, the vehicle control device 51 determines whether the target generator rotation speed NG* is equal to or greater than a predetermined first rotation speed Nth1 (e.g., 500[rpm]). If the absolute value of the target generator rotation speed NG* is equal to or greater than the first rotation speed Nth1, the vehicle control device 51 determines whether the generator brake B has been released. If the generator brake B has been released, a generator rotation speed control processing means (not separately shown) of the vehicle control device 51 performs a generator rotation speed control process to perform a torque control of the generator 16. If the generator brake B is not released, a generator brake release control processing means (not separately shown) of the vehicle control device 51 performs a generator brake release control process so as to release the generator brake B.

If in the generator rotation speed control process, a target generator torque TG* is determined and, on the basis of the target generator torque TG*, a torque control of the generator 16 is performed to generate a predetermined generator torque TG, the generator torque TG is converted into the ring gear torque TR, and is output from the ring gear R because the engine torque TE, the ring gear torque TR, and the generator torque TG are affected by reaction forces from one another as mentioned above.

As the ring gear torque TR is output from the ring gear R, the generator rotation speed NG fluctuates, and the ring gear torque TR fluctuates. The fluctuating ring gear torque TR is transferred to the drive wheels 37, so that the running feeling of the hybrid type vehicle deteriorates. Therefore, the ring gear torque TR is computed, taking into account a torque corresponding to the inertia of the generator 16 (inertia of the rotor 21 and a not-shown rotor shaft) involved in the fluctuations of the generator rotation speed NG.

Therefore, a ring gear torque computation processing means (not separately shown) of the vehicle control device 51 performs a ring gear torque computation process, in which the target generator torque TG* determined in the generator rotation speed control process is read, and a ring gear torque TR is computed based on the target generator torque TG*, and the ratio of the number of teeth of the ring gear R to the number of teeth of the sun gear S.

That is, where the inertia of the generator 16 is expressed as InG and the angular acceleration (rotation change rate) of the generator 16 is expressed as αG, the sun gear torque TS applied to the sun gear S can be determined by adding a torque equivalent component (inertia torque) TGI corresponding to the inertia InG:

$$TGI = InG \cdot \alpha G$$

to the target generator torque TG* as in:

$$TS = TG* + TGI \quad (3)$$
$$= TG* + InG \cdot \alpha G$$

Normally, the value assumed by the torque equivalent component TGI during acceleration of the hybrid type vehicle is negative with respect to the accelerating direction. The value of the torque equivalent component TGI during deceleration is positive. Furthermore, the angular acceleration αG is computed by differentiating the generator rotation speed NG.

If the number of teeth of the ring gear R is ρ times the number of teeth of the sun gear S, the ring gear torque TR is ρ times the sun gear torque TS, and therefore TR is expressed as:

$$TR = \rho \cdot TS \quad (4)$$
$$= \rho \cdot (TG* + TGI)$$
$$= \rho \cdot (TG* + InG \cdot \alpha G)$$

In this manner, the ring gear torque TR can be computed from the target generator torque TG* and the torque equivalent component TGI.

Therefore, a drive shaft torque estimation processing means (not separately shown) of the vehicle control device 51 performs a drive shaft torque estimation process, in which the torque of the output shaft 26 of the drive motor 25, that is, the drive shaft torque TR/OUT, is computed and estimated based on the target generator torque TG*, and the torque equivalent component TGI corresponding to the inertia InG of the generator 16. Therefore, the drive shaft torque estimation processing means computes the drive shaft torque TR/OUT based on the ring gear torque TR, and the ratio of the number of teeth of the second counter drive gear 27 to the number of teeth of the ring gear R.

If the generator brake B is engaged, the target generator torque TG* is set at zero (0), and therefore the ring gear torque TR has a proportional relationship with the engine torque TE. Therefore, the drive shaft torque estimation processing means reads the engine torque TE from the engine control device 46, and computes a ring gear torque TR from the engine torque TE using the aforementioned torque relational expression, and then estimates the drive shaft torque TR/OUT based on the ring gear torque TR, and the ratio of the number of teeth of the second counter drive gear 27 to the number of teeth of the ring gear R.

Subsequently, the target drive motor torque determination processing means performs a target drive motor torque determination process, in which a surplus or shortfall of the drive shaft TR/OUT is determined as a target drive motor torque TM* by subtracting the drive shaft TR/OUT from the vehicle requested torque TO*.

Then, a drive motor control processing means (not separately shown) of the vehicle control device 51 performs a drive motor control process, in which a torque control of the drive motor 25 is performed based on an estimated drive shaft TR/OUT, so as to control the drive motor torque TM.

If the absolute value of the target generator rotation speed NG* is smaller than the first rotation speed Nth1, the vehicle control device 51 determines whether the generator brake B is engaged. If the generator brake B is engaged, the vehicle control device 51 ends the process. If the generator brake B is not engaged, a generator brake engagement control processing means (not separately shown) of the vehicle control device 51 performs a generator brake engagement control process to engage the generator brake B.

Next described will be the flowchart of FIGS. 7 to 9.

Step S1: A system voltage determination process is performed.

Step S2: An accelerator pedal position AP and a brake pedal position BP are read.

Step S3: A vehicle speed V is computed.

Step S4: A vehicle requested torque TO* is determined.

Step S5: It is determined whether the vehicle requested torque TO* is greater than the maximum drive motor torque TMmax. If the vehicle requested torque TO* is greater than the maximum drive motor torque TMmax, the process proceeds to step S6. If the vehicle requested torque TO* is not greater than the maximum drive motor torque TMmax, the process proceeds to step S8.

Step S6: It is determined whether the engine 11 is at a stop. If the engine 11 is at a stop, the process proceeds to step S7. If the engine 11 is not at a stop (is being driven), the process proceeds to step S8.

Step S7: A rapid acceleration control process is performed. After that, the process ends.

Step S8: A driver requested output PD is computed.

Step S9: A battery charge-discharge requested output PB is computed.

Step S10: A vehicle-requested output PO is computed.

Step S11: An operation point of the engine 11 is determined.

Step S12: It is determined whether the engine 11 is in the drive region AR1. If the engine 11 is in the drive region AR1, the process proceeds to step S13. If the engine 11 is not in the drive region AR1, the process proceeds to step S14.

Step S13: It is determined whether the engine 11 is being driven. If the engine 11 is being driven, the process proceeds to step S17. If the engine 11 is not being driven, the process proceeds to step S15.

Step S14: It is determined whether the engine 11 is being driven. If the engine 11 is being driven, the process proceeds to step S16. If the engine 11 is not being driven, the process proceeds to step S26.

Step S15: An engine startup control process is performed. After that, the process ends.

Step S16: An engine stop control process is performed. After that, the process ends.

Step S17: An engine control process is performed.

Step S18: A target generator rotation speed NG* is determined.

Step S19: It is determined whether the absolute value of the target generator rotation speed NG* is equal to or greater than first rotation speed Nth1. If the absolute value of the target generator rotation speed NG* is equal to or greater than the first rotation speed Nth1, the process proceeds to step S20. If the absolute value of the target generator rotation speed NG* is less than the first rotation speed Nth1, the process proceeds to step S21.

Step S20: It is determined whether the generator brake B has been released. If the generator brake B has been released, the process proceeds to step S23. If the generator brake B has not been released, the process proceeds to step S24.

Step S21: It is determined whether the generator brake B has been engaged. If the generator brake B has been engaged, the process ends. If the generator brake B has not been engaged, the process proceeds to step S22.

Step S22: A generator brake engagement control process is performed. After that, the process ends.

Step S23: A generator rotation speed control process is performed.

Step S24: A generator brake release control process is performed. After that, the process ends.

Step S25: A drive shaft TR/OUT is estimated.

Step S26: A target drive motor torque TM* is determined.

Step S27: A drive motor control process is performed. After that, the process ends.

Figure 14:
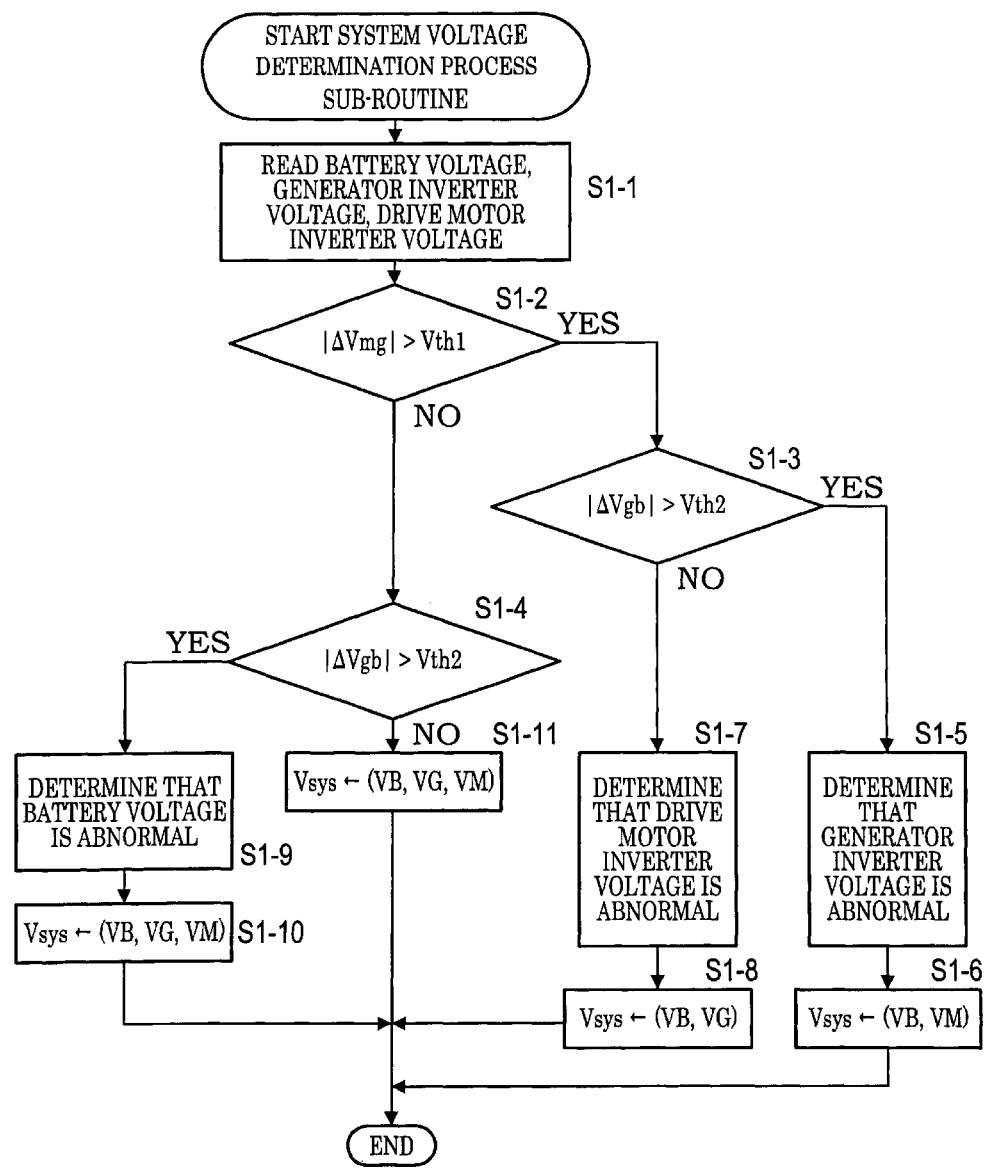
FIG. 14 is a chart illustrating a sub-routine of a system voltage determination process in the first embodiment of the invention.

Next described will be a sub-routine of the system voltage determination process of step S1 in FIG. 7. FIG. 14 is a chart illustrating the sub-routine of the system voltage determination process in the first embodiment of the invention.

First, the system voltage determination processing means 91 reads the battery voltage VB, reads the generator inverter voltage VG via the generator control device 47, and reads the drive motor inverter voltage VM via the drive motor control device 49. Next, a detection abnormality determination processing means (not separately shown) of the system voltage determination processing means 91 performs a detection abnormality determination process, in which an abnormality determination regarding the battery voltage VB, the generator inverter voltage VG and the drive motor inverter voltage VM is performed based on a difference in voltage, that is, a differential voltage, between two of the battery voltage VB, the generator inverter voltage VG and the drive motor inverter voltage VM, which are results of detection by the battery voltage sensor 72, the generator inverter sensor 75 and the drive motor inverter sensor 76, respectively. That is, in the detection abnormality determination process, it is determined whether the absolute value of the value obtained by subtracting the generator inverter voltage VG from the drive motor inverter voltage VM, that is, a first differential voltage $\Delta Vmg$:

$$\Delta Vmg = |VM - VG|$$

is greater than a threshold value Vth1.

If the first differential voltage $\Delta Vmg$ is greater than the threshold value Vth1, the detection abnormality determination processing means determines whether the absolute value of the value obtained by subtracting the battery voltage VB from the generator inverter voltage VG, that is, a second differential voltage $\Delta Vgb$:

$$\Delta Vgb = |VG - VB|$$

is greater than a threshold value Vth2. If the second differential voltage $\Delta Vgb$ is greater than the threshold value Vth2, the detection abnormality determination processing means determines that the generator inverter voltage VG is abnormal. If the second differential voltage $\Delta Vgb$ is less than or equal to the threshold value, the detection abnormality determination processing means determines that the drive motor inverter voltage VM is abnormal.

If the first differential voltage $\Delta Vmg$ is less than or equal to the threshold value Vth1, the detection abnormality determination processing means determines whether the second differential voltage $\Delta Vgb$ is greater than the threshold value Vth2. If the second differential voltage $\Delta Vgb$ is greater than the threshold value Vth2, the detection abnormality determination processing means determines that the battery voltage VB is abnormal. If the second differential voltage ΔVgb is less than or equal to the threshold value Vth2, the detection abnormality determination processing means determines that each of the battery voltage VB, the generator inverter voltage VG and the drive motor inverter voltage VM is normal. Although in this embodiment, the threshold values Vth1 and Vth2 are equal, the threshold values may be different from each other.

If it is determined that the generator inverter voltage VG is abnormal, the system voltage determination processing means 91 sets the battery voltage VB or the drive motor inverter voltage VM as a system voltage Vsys. If it is determined that the drive motor inverter voltage VM is abnormal, the system voltage determination processing means 91 sets the battery voltage VB or the generator inverter voltage VG as a system voltage Vsys. If it is determined that the battery voltage VB is abnormal, the system voltage determination processing means 91 sets the generator inverter voltage VG or the drive motor inverter voltage VM as a system voltage Vsys. If each of the battery voltage VB, the generator inverter voltage VG and the drive motor inverter voltage VM is normal, the system voltage determination processing means 91 sets the battery voltage VB, the generator inverter voltage VG or the drive motor inverter voltage VM as a system voltage Vsys.

Thus, it is possible to determine whether one of the battery voltage VB, the generator inverter voltage VG and the drive motor inverter voltage VM is abnormal based on a differential voltage between two of the three voltages. That is, if a detection abnormality occurs in any one of the battery voltage sensor 72, the generator inverter sensor 75 and the drive motor inverter sensor 76, a system voltage Vsys can be determined based on normal voltages of the battery voltage VB, the generator inverter voltage VG and the drive motor inverter voltage VM. Therefore, it is possible to smoothly perform various drive controls, such as the torque control of the generator 16, the rotation speed control of the generator 16, the torque control of the drive motor 25, etc.

Next, the flowchart will be described.

Step S1-1: The battery voltage VB, the generator inverter voltage VG and the drive motor inverter voltage VM are read.

Step S1-2: It is determined whether the first differential voltage ΔVmg is greater than the threshold value Vth1. If the first differential voltage ΔVmg is greater than the threshold value Vth1, the process proceeds to step S1-3. If the first differential voltage ΔVmg is not greater than the threshold value Vth1, the process proceeds to step S1-4.

Step S1-3: It is determined whether the second differential voltage ΔVgb is greater than the threshold value Vth2. If the second differential voltage ΔVgb is greater than the threshold value Vth2, the process proceeds to step S1-5. If the second differential voltage ΔVgb is not greater than the threshold value Vth2, the process proceeds to step S1-7.

Step S1-4: It is determined whether the second differential voltage ΔVgb is greater than the threshold value Vth2. If the second differential voltage ΔVgb is greater than the threshold value Vth2, the process proceeds to step S1-9. If the second differential voltage ΔVgb is not greater than the threshold value Vth2, the process proceeds to step S1-11.

Step S1-5: It is determined that the generator inverter voltage VG is abnormal.

Step S1-6: The battery voltage VB or the drive motor inverter voltage VM is set as a system voltage Vsys. After that, the process ends.

Step S1-7: It is determined that the drive motor inverter voltage VM is abnormal.

Step S1-8: The battery voltage VB or the generator inverter voltage VG is set as a system voltage Vsys. After that, the process ends.

Step S1-9: It is determined that the battery voltage VB is abnormal.

Step S1-10: The generator inverter voltage VG or the drive motor inverter voltage VM is set as a system voltage Vsys. After that, the process ends.

Step S1-11: The battery voltage VB, the generator inverter voltage VG or the drive motor inverter voltage VM is set as a system voltage Vsys. After that, the process ends.

Figure 15:
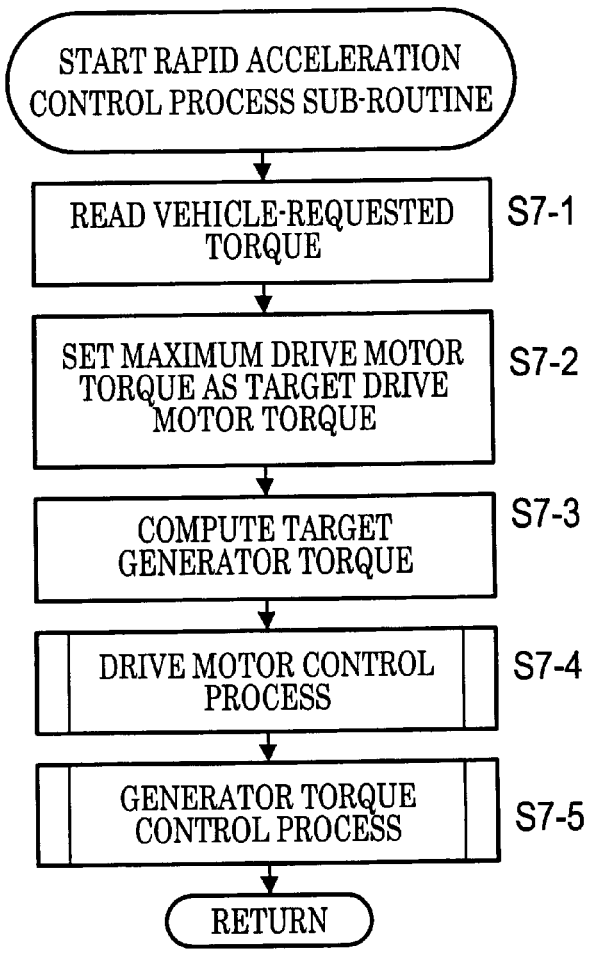
FIG. 15 is a chart illustrating a sub-routine of a rapid acceleration control process in the first embodiment of the invention.

Next described will be a sub-routine of the rapid acceleration control process of step S7 in FIG. 7. FIG. 15 is a chart illustrating the sub-routine of the rapid acceleration control process in the first embodiment of the invention.

First, the rapid acceleration control processing means reads the vehicle-requested torque TO*, and sets the maximum drive motor torque TMmax as a target drive motor torque TM*. Subsequently, a target generator torque computation processing means of the rapid acceleration control processing means performs a target generator torque computation process, in which a differential torque ΔT between the vehicle-requested torque TO* and the target drive motor torque TM* is computed, and a shortfall of the maximum drive motor torque TMmax, which is the target drive motor torque TM*, is computed and determined as a target generator torque TG*.

Then, the drive motor control processing means of the rapid acceleration control processing means performs a drive motor control process, in which the torque control of the drive motor 25 (FIG. 6) is performed based on the target drive motor torque TM*. The generator torque control means of the rapid acceleration control processing means performs the generator torque control process, in which a torque control of the generator 16 is performed based on the generator torque TG.

Next, the flowchart will be described.

Step S7-1: The vehicle-requested torque TO* is read

Step S7-2: The maximum drive motor torque TMmax is set as a target drive motor torque TM*.

Step S7-3: The target generator torque TG* is computed.

Step S7-4: The drive motor control process is performed.

Step S7-5: The generator torque control process is performed. The process then returns.

Figure 16:
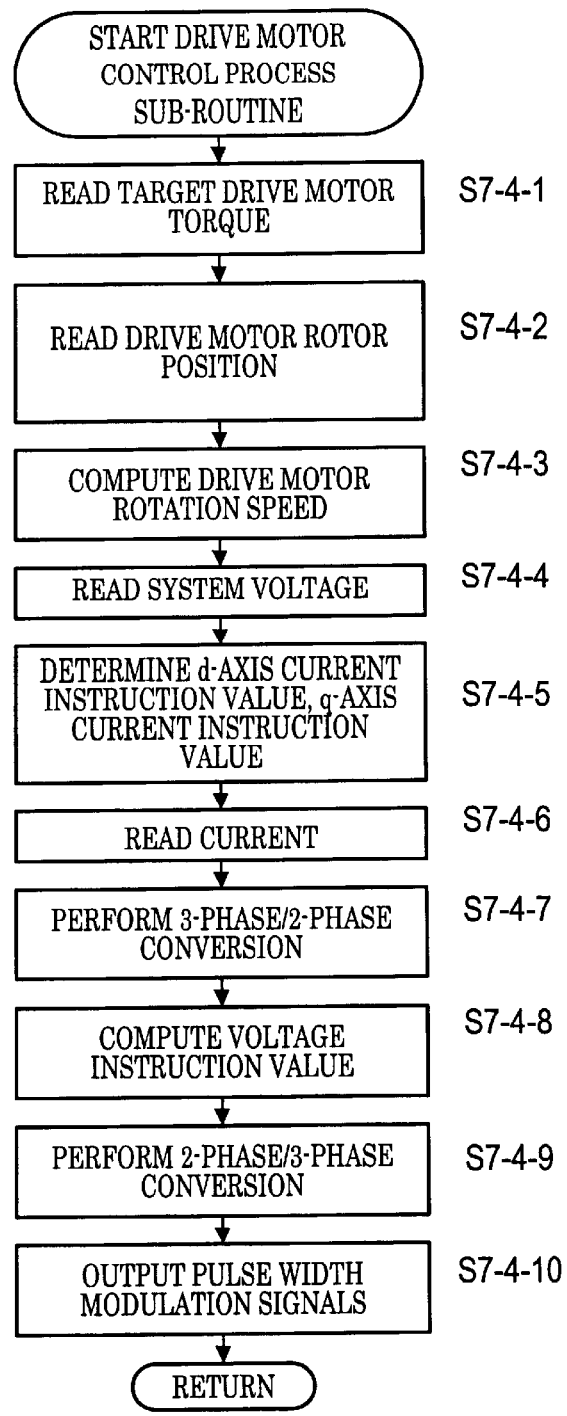
FIG. 16 is a chart illustrating a sub-routine of a drive motor control process in the first embodiment of the invention.

Next described will be a sub-routine of the drive motor control process of step S27 of FIG. 9 and Step S7-4 of FIG. 15. FIG. 16 is a chart illustrating the sub-routine of the drive motor control process in the first embodiment of the invention.

First, the drive motor control processing means reads the target drive motor torque TM*, and reads the drive motor rotor position θM. From the drive motor rotor position θM, the drive motor control processing means computes a drive motor rotation speed NM. Subsequently, the means reads the system voltage Vsys. Next, the drive motor control processing means determines a d-axis current instruction value IMd* and a q-axis current instruction value IMq* based on the target drive motor torque TM*, the drive motor rotation speed NM and the system voltage Vsys, with reference to a current instruction value map (not separately shown) for the drive motor control recorded in the recording device.

Furthermore, the drive motor control processing means reads the electric currents IMU, IMV from the electric current sensors 68, 69 (FIG. 6). From the currents IMU, IMV, the means computes a current IMW:

$$IMW = IMU - IMV$$

The current IMW may also be detected by an electric current sensor, as is the case with the currents IMU, IMV.

Subsequently, the drive motor control processing means performs 3-phase/2-phase conversion of converting the currents IMU, IMV, IMW into a d-axis current IMd and a q-axis current IMq. From the d-axis current IMd, the q-axis current IMq, the d-axis current instruction value IMd* and the q-axis current instruction value IMq*, the means computes voltage instruction values VMd*, VMq*. Then, the drive motor control processing means performs 2-phase/3-phase conversion of converting the voltage instruction values VMd*, VMq* into voltage instruction values VMU*, VMV*, VMW*. From the voltage instruction values VMU*, VMV*, VMW*, the means computes pulse width modulation signals SU, SV, SW. Then, the means outputs the pulse width modulation signals SU, SV, SW to a drive processing means of the drive motor control processing means. The drive processing means performs a drive process, and sends a drive signal SG2 to the inverter 29 based on the pulse width modulation signals SU, SV, SW.

Next, the flowchart will be described. Because the same process is performed in step S7-4 and step S27, the process will be described in context of step S7-4.

Step S7-4-1: The target drive motor torque TM* is read.
Step S7-4-2: The drive motor rotor position θM is read.
Step S7-4-3: The drive motor rotation speed NM is computed.
Step S7-4-4: The system voltage Vsys is read.
Step S7-4-5: The d-axis current instruction value IMd* and the q-axis current instruction value IMq* are determined.
Step S7-4-6: The currents IMU, IMV are read.
Step S7-4-7: The 3-phase/2-phase conversion is performed.
Step S7-4-8: The voltage instruction values VMd*, VMq* are computed.
Step S7-4-9: The 2-phase/3-phase conversion is performed.
Step S7-4-10: The pulse width modulation signals SU, SV, SW are output. Then, the process returns.

Figure 17:
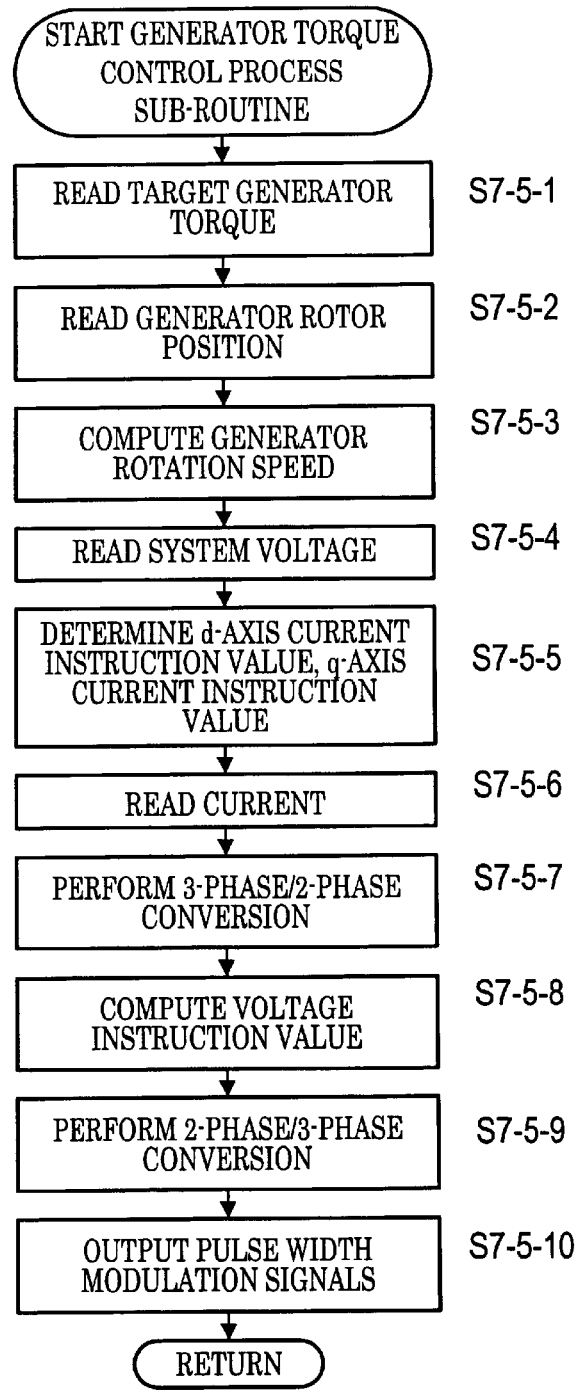
FIG. 17 is a chart illustrating a sub-routine of a generator torque control process in the first embodiment of the invention.

Next described will be a sub-routine of the generator torque control process of step S7-5 in FIG. 15. FIG. 17 is a chart illustrating the sub-routine of the generator torque control process in the first embodiment of the invention.

First, the generator torque control processing means reads the target generator torque TG*, and reads the generator rotor position θG. From the generator rotor position θG, the means computes a generator rotation speed NG. Subsequently, the means reads the system voltage Vsys. Next, the generator torque control processing means determines a d-axis current instruction value IGd* and a q-axis current instruction value IGq* based on the target generator torque TG*, the generator rotation speed NG and the system voltage Vsys, with reference to a not-shown current instruction value map for generator control recorded in the recording device.

Furthermore, the generator torque control processing means reads the currents IGU, IGV from the electric current sensors 66, 67 (FIG. 6). From the currents IGU, IGV, the means computes a current IGW:

$$IGW = IGU - IGV$$

The current IGW may also be detected by an electric current sensor as in the case of the currents IGU, IGV.

Subsequently, the generator torque control processing means performs 3-phase/2-phase conversion of converting the currents IGU, IGV, IGW into a d-axis current IGd and a q-axis current IGq. From the d-axis current IGd, the q-axis current IGq, the d-axis current instruction value IGd* and the q-axis current instruction value IGq*, the means computes voltage instruction values VGd*, VGq*. Then, the drive motor control processing means performs 2-phase/3-phase conversion of converting the voltage instruction values VGd*, VGq* into voltage instruction values VGU*, VGV*, VGW*. From the voltage instruction values VGU*, VGV*, VGW*, the means computes pulse width modulation signals SU, SV, SW. Then, the means outputs the pulse width modulation signals SU, SV, SW to a drive processing means of the generator torque control processing means. The drive processing means performs a drive process, and sends a drive signal SG1 to the inverter 28 based on the pulse width modulation signals SU, SV, SW.

Next, the flowchart will be described.
Step S7-5-1: The target generator torque TG* is read.
Step S7-5-2: The generator rotor position θG is read.
Step S7-5-3: The generator rotation speed NG is computed.
Step S7-5-4: The system voltage Vsys is read.
Step S7-5-5: The d-axis current instruction value IGd* and the q-axis current instruction value IGq* are determined.
Step S7-5-6: The currents IGU, IGV are read.
Step S7-5-7: The 3-phase/2-phase conversion is performed.
Step S7-5-8: The voltage instruction values VGd*, VGq* are computed.
Step S7-5-9: The 2-phase/3-phase conversion is performed.
Step S7-5-10: The pulse width modulation signals SU, SV, SW are output. Then, the process returns.

Figure 18:
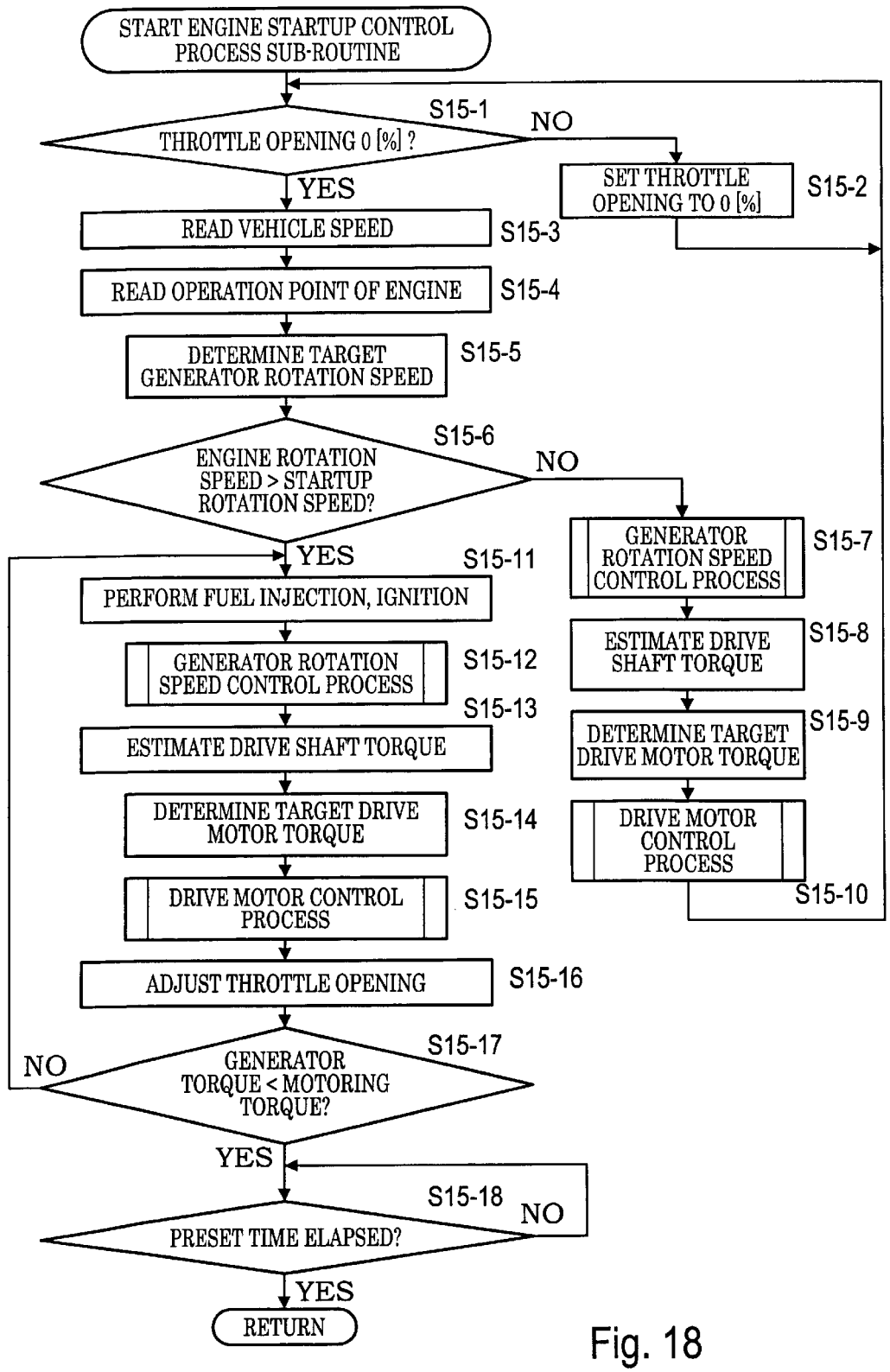
FIG. 18 is a chart illustrating a sub-routine of an engine startup control process in the first embodiment of the invention.

Next described will be a sub-routine of the engine startup control process of step S15 in FIG. 8. FIG. 18 is a chart illustrating the sub-routine of the engine startup control process in the first embodiment of the invention.

First, the engine startup control processing means reads the degree of throttle opening θ. If the degree of throttle opening θ is 0 [%], the means reads the vehicle speed V, and reads the operation point of the engine 11 (FIG. 2) determined in the target engine operation state setting process. The vehicle speed V is computed based on the drive motor rotor position θM as mentioned above.

Subsequently, the engine startup control processing means reads the drive motor rotor position θM. The means computes a ring gear rotation speed NR based on the drive motor rotor position θM and the gear ratio γR, and reads the target engine rotation speed NE* at the aforementioned operation point. The engine startup control processing means then computes and determines a target generator rotation speed NG* based on the ring gear rotation speed NR and the target engine rotation speed NE* by using the rotation speed relational expression.

Then, the engine startup control processing means compares the engine rotation speed NE with a pre-set startup rotation speed NEth1, and determines whether the engine rotation speed NE is higher than the startup rotation speed NEth1. If the engine rotation speed NE is higher than the startup rotation speed NEth1, the engine startup control processing means performs fuel injection and ignition in the engine 11.

Subsequently, the generator rotation speed control processing means of the engine startup control processing means performs a generator rotation speed control process based on the target generator rotation speed NG*, so as to increase the generator rotation speed NG and therefore increase the engine rotation speed NE.

Then, the engine startup control processing means estimates a drive shaft torque TR/OUT, and determines a target drive motor torque TM*, and performs the drive motor control process, as in steps S25 to S27.

Furthermore, the engine startup control processing means adjusts the degree of throttle opening θ so that the engine rotation speed NE reaches the target engine rotation speed NE*. Next, in order to determine whether the engine 11 is normally driven, the engine startup control processing means determines whether the generator torque TG is smaller than a motoring torque TEth involved in the startup of the engine 11. Then, the means waits for a predetermined time to elapse with the generator torque TG remaining smaller than the motoring torque TEth. If the engine rotation speed NE is less than or equal to the startup rotation speed NEth1, the generator rotation speed control processing means performs the generator rotation speed control process based on the target generator rotation speed NG*. Subsequently, the engine startup control processing means estimates a drive shaft torque TR/OUT, and determines a target drive motor torque TM*, and performs the drive motor control process as in steps S25 to S27.

Next, the flowchart will be described.

Step S15-1: It is determined whether the degree of throttle opening θ is 0 [%]. If the degree of throttle opening θ is 0 [%], the process proceeds to step S15-3. If the degree of throttle opening θ is not 0 [%], the process proceeds to step S15-2.

Step S15-2: The degree of throttle opening θ is set to 0 [%]. Then, the process returns to Step S15-1.

Step S15-3: The vehicle speed V is read.

Step S15-4: The operation point of the engine 11 is read.

Step S15-5: The target generator rotation speed NG* is determined.

Step S15-6: It is determined whether the engine rotation speed NE is higher than the startup rotation speed NEth1. If the engine rotation speed NE is greater than the startup rotation speed NEth1, the process proceeds to step S15-11. If the engine rotation speed NE is not greater than the startup rotation speed NEth1, the process proceeds to step S15-7.

Step S15-7: The generator rotation speed control process is performed.

Step S15-8: The drive shaft torque TR/OUT is estimated.

Step S15-9: The target drive motor torque TM* is determined.

Step S15-10: The drive motor control process is performed. Then, the process returns to Step S15-1.

Step S15-11: Fuel injection and ignition are performed.

Step S15-12: The generator rotation speed control process is performed.

Step S15-13: The drive shaft torque TR/OUT is estimated.

Step S15-14: The target drive motor torque TM* is determined.

Step S15-15: The drive motor control process is performed.

Step S15-16: The degree of throttle opening θ is adjusted.

Step S15-17: It is determined whether the generator torque TG is less than the motoring torque TEth. If the generator torque TG is less than the motoring torque TEth, the process proceeds to step S15-18. If the generator torque TG is not less than the motoring torque TEth, the process returns to Step S15-11.

Step S15-18: The elapse of a predetermined time is awaited. At the elapse, the process returns.

Figure 19:
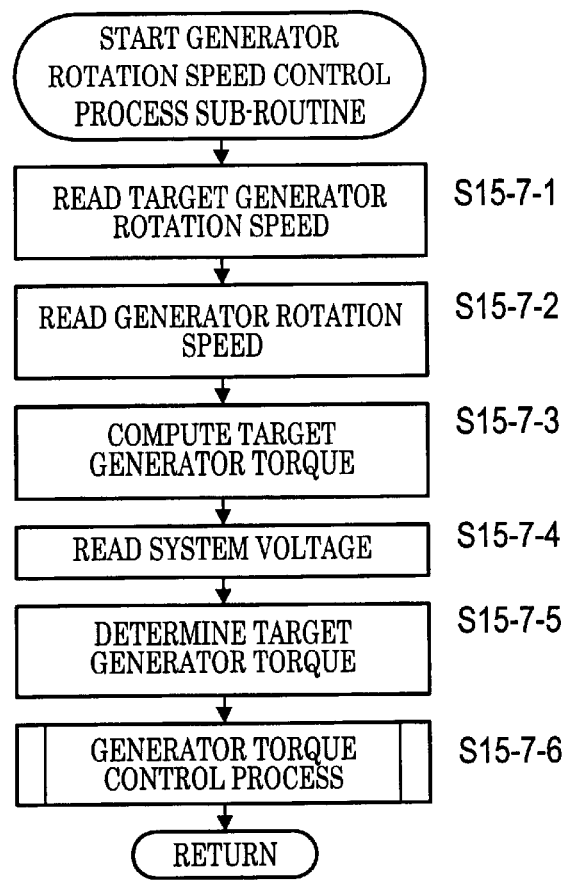
FIG. 19 is a chart illustrating a sub-routine of a generator rotation speed control process in the first embodiment of the invention.
Figure 20:
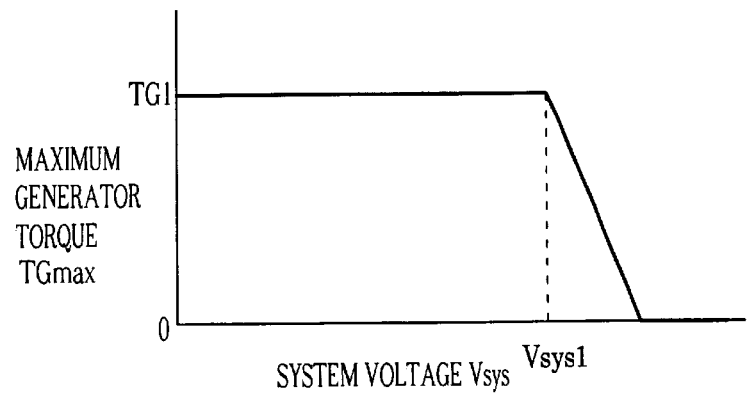
FIG. 20 is a diagram indicating a generator torque restriction map in the first embodiment of the invention.

Next described will be a sub-routine of the generator rotation speed control process of step S23 in FIG. 9, and steps S15-7 and S15-12 in FIG. 18. FIG. 19 is a chart illustrating the sub-routine of the generator rotation speed control process in the first embodiment of the invention. FIG. 20 is a diagram indicating a generator torque restriction map in the first embodiment of the invention. In FIG. 20, the horizontal axis indicates the system voltage Vsys, and the vertical axis indicates the maximum generator torque TGmax.

First, the generator rotation speed control processing means reads the target generator rotation speed NG* and the generator rotation speed NG. The means performs a PI control based on a differential rotation speed ΔNG between the generator rotation speed NG and the target generator rotation speed NG*, and computes a target generator torque TG*. If the differential rotation speed ΔNG is greater, the target generator torque TG* is increased with the positive-negative sign being considered.

Subsequently, the generator torque restriction processing means of the generator rotation speed control processing means performs a generator torque restriction process, in which the system voltage Vsys is read, and the generator torque TG is restricted corresponding to the system voltage Vsys. Therefore, the generator torque restriction processing means computes the maximum generator torque TGmax of the generator torque TG corresponding to the system voltage Vsys with reference to the generator torque restriction map of FIG. 20 recorded in the recording device in the vehicle control device 51 (FIG. 6). Then, the means restricts the generator torque TG based on the maximum generator torque TGmax. In the generator torque restriction map, the maximum generator torque TGmax assumes a predetermined value TG1 if the system voltage Vsys is less than or equal to a predetermined threshold value Vsys1. If the system voltage Vsys is greater than the threshold value Vsys1, the maximum generator torque TGmax is reduced with increases in the system voltage Vsys. Therefore, if the generator 16 is driven at the maximum generator torque TGmax, the target generator torque TG* is reduced as the maximum generator torque TGmax decreases. The generator torque restriction processing means determines the restricted generator torque TG as a target generator torque TG*.

Subsequently, the generator torque control processing means of the generator rotation speed control processing means performs the generator torque control process illustrated in FIG. 17, thereby performing the torque control of the generator 16.

Thus, if the system voltage Vsys becomes greater than the threshold value, the generator torque TG is restricted. Therefore, increases in the load applied to the inverter 28 can be prevented. Furthermore, with regard to the driving of the inverter 28, if the switching of a transistor of the inverter 28 is performed, and therefore, a surge voltage which is a transient voltage transiently occurs so that the system voltage Vsys becomes high, the load applied to the inverter 28 does not increase.

Next, the flowchart will be described. Because the same process is performed in steps S15-7, S15-12 and S23, the process will be described in context of step S15-7.

Step S15-7-1: The target generator rotation speed NG* is read.

Step S15-7-2: The generator rotation speed NG is read.

Step S15-7-3: The target generator torque TG* is computed.

Step S15-7-4: The system voltage Vsys is read.

Step S15-7-5: The target generator torque TG* is determined.

Step S15-7-6: The generator torque control process is performed. Then, the process returns.

Figure 21:
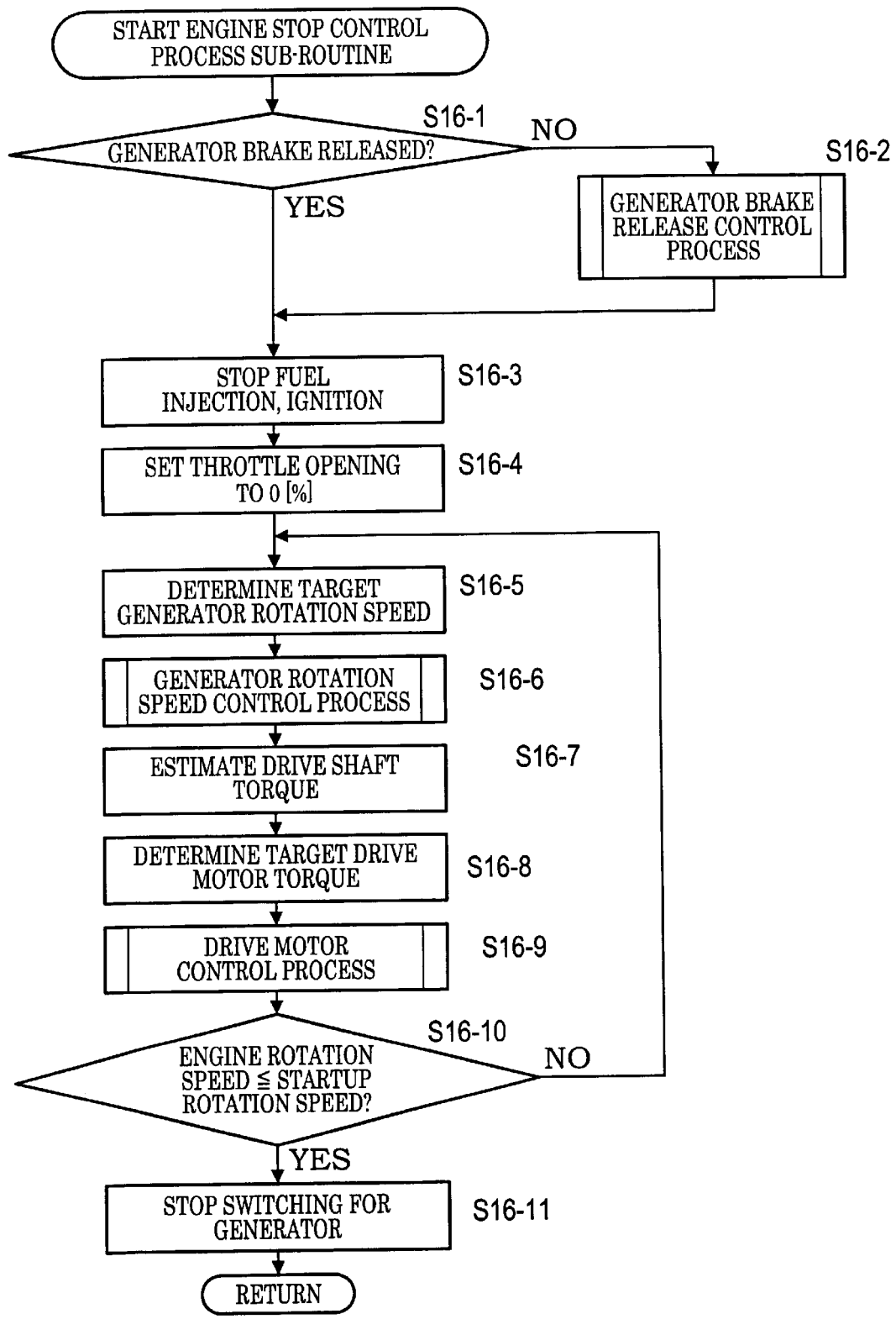
FIG. 21 is a chart illustrating a sub-routine of an engine stop control process in the first embodiment of the invention.

Next described will be a sub-routine of the engine stop control process of step S16 in FIG. 8. FIG. 21 is a chart illustrating the sub-routine of the engine stop control process in the first embodiment of the invention.

First, the engine stop control processing means determines whether the generator brake B has been released (FIG. 6). If the generator brake B is not released, but is engaged, the generator brake release control processing means of the engine stop control processing means performs the generator brake release control process to release the generator brake B.

If the generator brake B is released, the engine stop control processing means stops fuel injection and ignition in the engine 11, and sets the degree of throttle opening θ to 0 [%].

Subsequently, the engine stop control processing means reads the ring gear rotation speed NR, and determines a target generator rotation speed NG* based on the ring gear rotation speed NR and the target engine rotation speed NE* (0 [rpm]), by using the rotation speed relational expression. After the generator rotation speed control process illustrated in FIG. 19, the engine stop control processing means estimates a drive shaft torque TR/OUT, and determines a target drive motor torque TM*, and performs the drive motor control process, as in steps S25 to S27.

Next, the engine stop control processing means determines whether the engine rotation speed NE is less than or equal to a stop rotation speed NEth2. If the engine rotation speed NE is less than or equal to the stop rotation speed NEth2, the switching for the generator 16 is stopped to shut down the generator 16.

Next, the flowchart will be described.

Step S16-1: It is determined whether the generator brake B has been released. If the generator brake B is released, the process proceeds to step S16-3. If the generator brake B is not released, the process proceeds to step S16-2.

Step S16-2: The generator brake release control process is performed.

Step S16-3: Fuel injection and ignition are stopped.

Step S16-4: The degree of throttle opening θ is set to 0 [%].

Step S16-5: The target generator rotation speed NG* is determined.

Step S16-6: The generator rotation speed control process is performed.

Step S16-7: The drive shaft torque TR/OUT is estimated.

Step S16-8: The target drive motor torque TM* is determined.

Step S16-9: The drive motor control process is performed.

Step S16-10: It is determined whether the engine rotation speed NE is less than or equal to the stop rotation speed NEth2. If the engine rotation speed NE is less than or equal to the stop rotation speed NEth2, the process proceeds to step S16-11. If the engine rotation speed NE is greater than the stop rotation speed NEth2, the process returns to step S16-5.

Step S16-11: The switching for the generator 16 is stopped. Then, the process returns.

Figure 22:
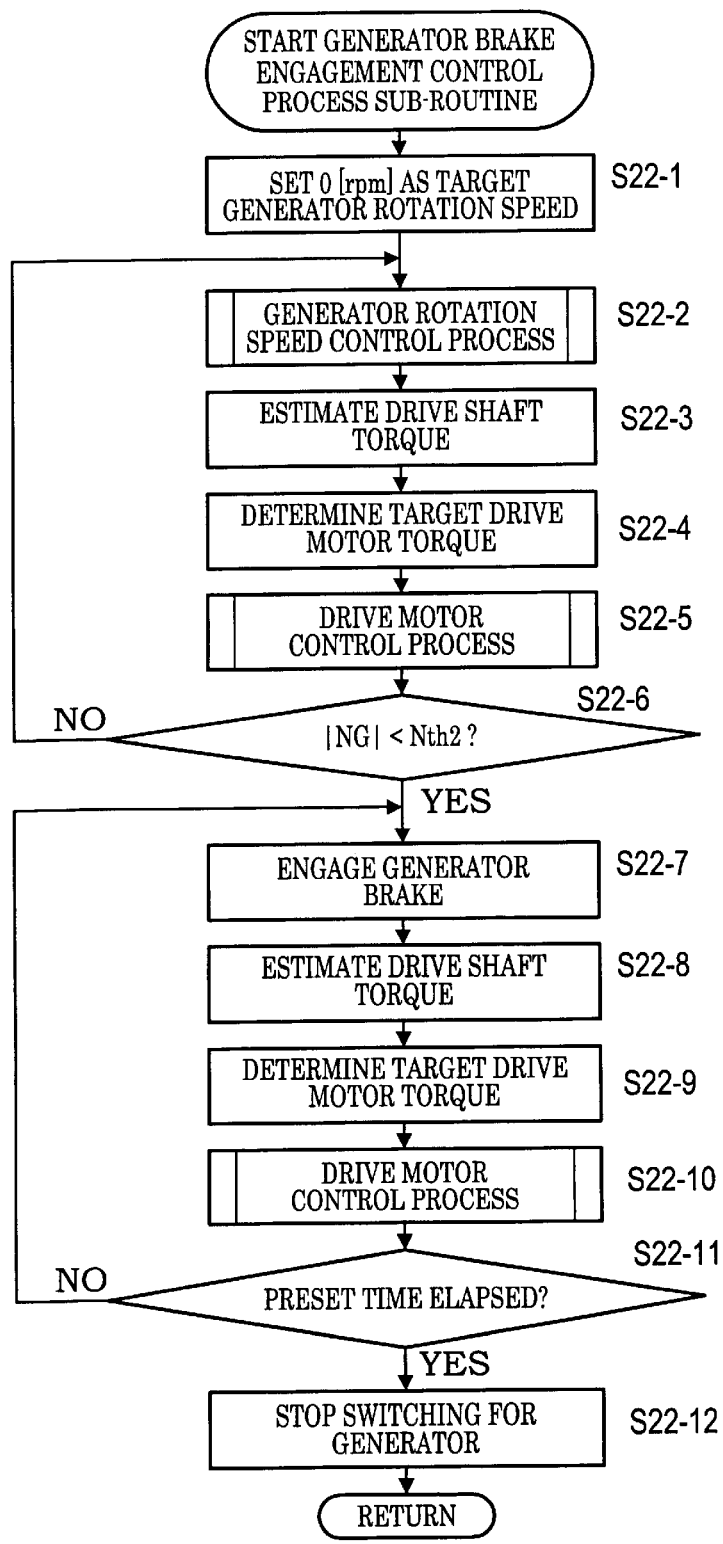
FIG. 22 is a chart illustrating a sub-routine of a generator brake engagement control process in the first embodiment of the invention.

Next described will be a sub-routine of the generator brake engagement control process of step S22 in FIG. 9. FIG. 22 is a chart illustrating the sub-routine of the generator brake engagement control process in the first embodiment of the invention.

First, the generator brake engagement control processing means switches a generator brake request for requesting engagement of the generator brake B (FIG. 6) from an off-status to an on-status, and sets 0 [rpm] as a target generator rotation speed NG*, and performs the generator rotation speed control process illustrated in FIG. 19. After that, as in steps S25 to S27, the generator brake engagement control processing means estimates a drive shaft torque TR/OUT, and determines a target drive motor torque TM*, and performs the drive motor control process.

Next, the generator brake engagement control processing means determines whether the absolute value of the generator rotation speed NG is less than a predetermined second rotation speed Nth2 (e.g., 100 [rpm]). If the absolute value of the generator rotation speed NG is less than the second rotation speed Nth2, the means switches the generator brake B from an off-state to an on-state, thereby engaging the brake. Subsequently, the generator brake engagement control processing means estimates a drive shaft torque TR/OUT, and determines a target drive motor torque TM*, and performs the drive motor control process, as in steps S25 to S27.

After a predetermined time elapses with the generator brake B remaining in an engaged state, the generator brake engagement control processing means stops the switching for the generator 16 to shut down the generator 16.

Next, the flowchart will be described.

Step S22-1: The target generator rotation speed NG* is set at 0 [rpm].

Step S22-2: The generator rotation speed control process is performed.

Step S22-3: The drive shaft torque TR/OUT is estimated.

Step S22-4: The target drive motor torque TM* is determined.

Step S22-5: The drive motor control process is performed.

Step S22-6: It is determined whether the absolute value of the generator rotation speed NG is smaller than the second rotation speed Nth2. If the absolute value of the generator rotation speed NG is less than the second rotation speed Nth2, the process proceeds to step S22-7. If absolute value of the generator rotation speed NG is not less than the second rotation speed Nth2, the process returns to step S22-2.

Step S22-7: The generator brake B is engaged.

Step S22-8: The drive shaft torque TR/OUT is estimated.

Step S22-9: The target drive motor torque TM* is determined.

Step S22-10: The drive motor control process is performed.

Step S22-11: It is determined whether the predetermined time has elapsed. If the predetermined has elapsed, the process proceeds to step S22-12. If the time has not elapsed, the process returns to step S22-7.

Step S22-12: The switching for the generator 16 is stopped. Then, the process returns.

Figure 23:
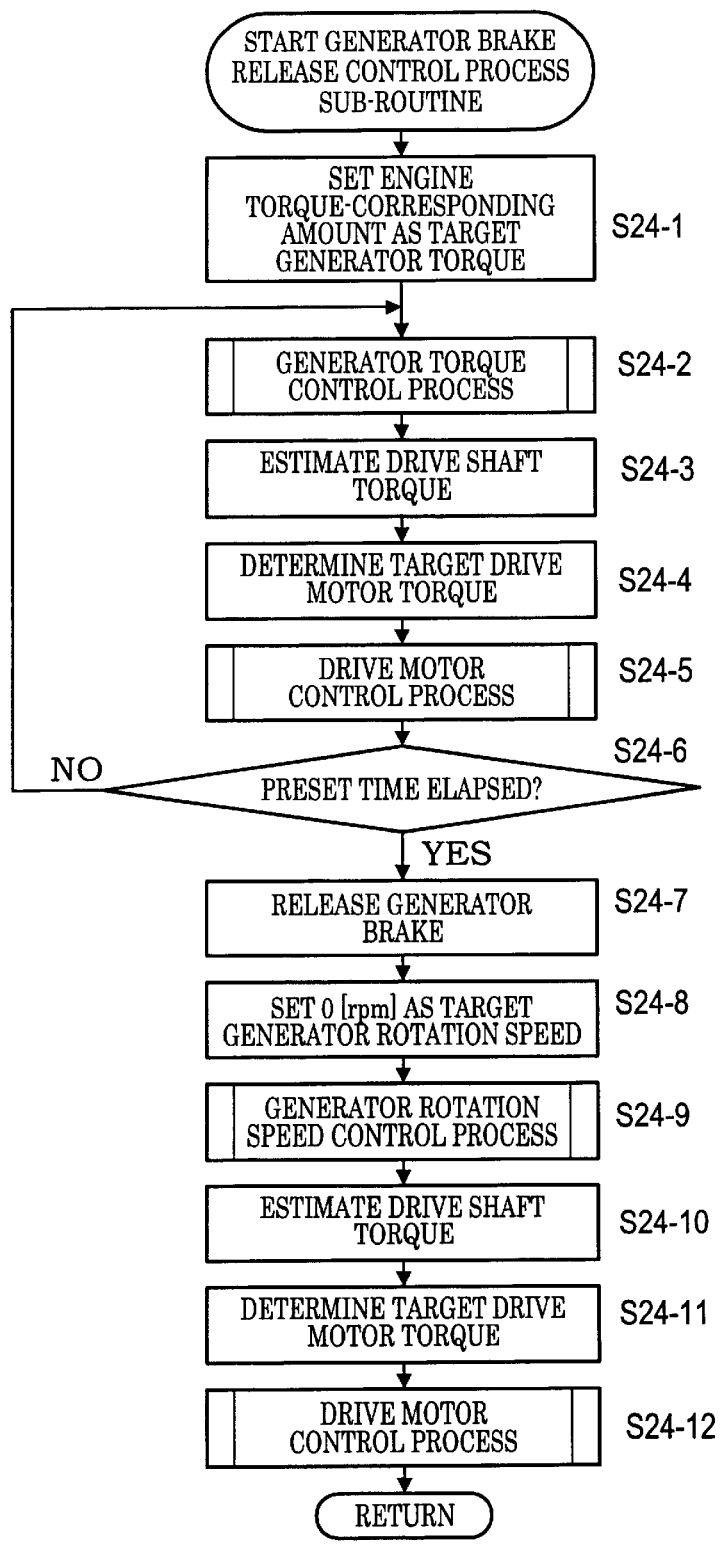
FIG. 23 is a chart illustrating a sub-routine of a generator brake release control process in the first embodiment of the invention.

Next described will be a sub-routine of the generator brake release control process of step S24 in FIG. 9. FIG. 23 is a chart illustrating the sub-routine of the generator brake release control process in the first embodiment of the invention.

While the generator brake B (FIG. 6) is engaged in the generator brake release control process, a predetermined engine torque TE acts on the rotor 21 of the generator 16. Therefore, if the generator brake B is simply released, the engine torque TE is transferred to the rotor 21, so that the generator torque TG and the engine torque TE greatly change, thereby causing shocks.

Hence, in the engine control device 46, the engine torque TE transferred to the rotor 21 is estimated or computed. The generator brake release control processing means reads a torque corresponding to the estimated or computed engine torque TE, that is, the engine torque-corresponding amount, and sets the engine torque-corresponding amount as a target generator torque TG*. Subsequently, the generator brake release control processing means performs the generator torque control process illustrated in FIG. 17, and then estimates a drive shaft torque TR/OUT, and determines a target drive motor torque TM*, and performs the drive motor control process as in steps S25 to S27.

At the elapse of a predetermined time following the start of the generator torque control process, the generator brake release control processing means switches the generator brake B from the on-state to the off-state, thereby releasing the brake. After setting the target generator rotation speed NG* at 0 [rpm], the means performs the generator rotation speed control process illustrated in FIG. 19. Subsequently, the generator brake release control processing means estimates a drive shaft torque TR/OUT, and determines a target drive motor torque TM*, and performs the drive motor control process as in steps S25 to S27. The aforementioned engine torque-corresponding amount is estimated or computed by learning the torque ratio of the generator torque TG to the engine torque TE.

Next, the flowchart will be described.

Step S24-1: The engine torque-corresponding amount is set as a target generator torque TG*.

Step S24-2: The generator torque control process is performed.

Step S24-3: The drive shaft torque TR/OUT is estimated.

Step S24-4: The target drive motor torque TM* is determined.

Step S24-5: The drive motor control process is performed.

Step S24-6: It is determined whether the predetermined time has elapsed. If the predetermined time has elapsed, the process proceeds to step S24-7. If the time has not elapsed, the process returns Step S24-2.

Step S24-7: The generator brake B is released.

Step S24-8: The target generator rotation speed NG* is set at 0 [rpm].

Step S24-9: The generator rotation speed control process is performed.

Step S24-10: The drive shaft torque TR/OUT is estimated.

Step S24-11: The target drive motor torque TM* is determined.

Step S24-12: The drive motor control process is performed. Then, the process returns.

If any one of the battery voltage sensor 72, the generator inverter sensor 75 and the drive motor inverter sensor 76 has a detection abnormality due to a broken wire, a short circuit or the like, it becomes impossible to normally detect the battery voltage VB, the generator inverter voltage VG or the drive motor inverter voltage VM, and therefore it becomes impossible to smoothly perform various drive controls such as the torque control of the generator 16, the rotation speed control of the generator 16, the torque control of the drive motor 25, etc.

Below described will be a second embodiment of the invention that is designed so that various drive control can be smoothly performed even if a broken wire or a short circuit occurs in any one of the battery voltage sensor 72, the generator inverter sensor 75 and the drive motor inverter sensor 76.

Figure 24:
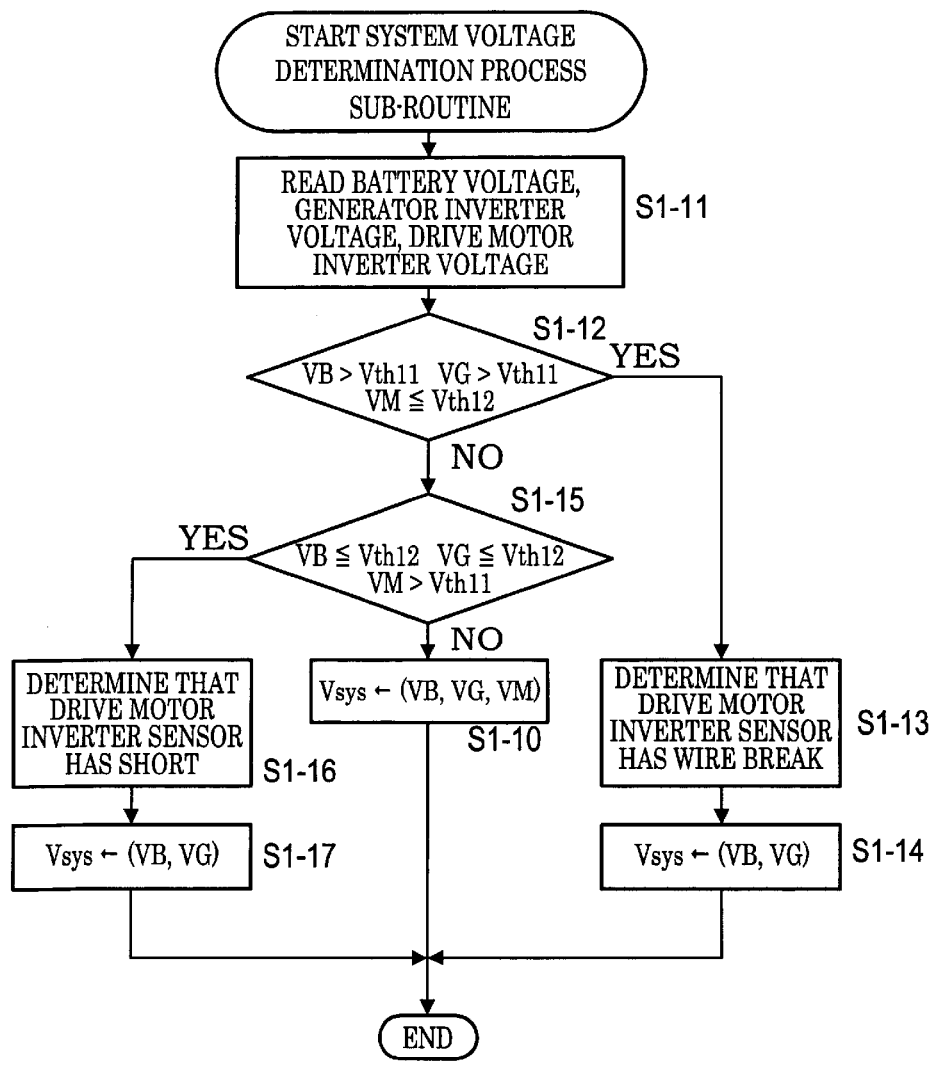
FIG. 24 is a chart illustrating a sub-routine of a system voltage determination process in a second embodiment of the invention.

FIG. 24 is a chart illustrating a sub-routine of a system voltage determination process in the second embodiment of the invention.

First, the system voltage determination processing means 91 (FIG. 1) reads the battery voltage VB, which is a result of detection by the battery voltage sensor 72 as a third voltage detection means, and reads, via the generator control device 47 (FIG. 6), the generator inverter voltage VG, which is a result of detection by the generator inverter sensor 75 as a first voltage detection means, and reads, bia the drive motor control device 49, the drive motor inverter voltage VM, which is a result of detection by the drive motor inverter sensor 76 as a second voltage detection means. Next, a detection abnormality determination processing means (not separately shown) of the system voltage determination processing means 91 performs a detection abnormality determination process, in which abnormality determination regarding the battery voltage VB, the generator inverter voltage VG and the drive motor inverter voltage VM is performed based on the battery voltage VB, the generator inverter voltage VG and the drive motor inverter voltage VM. That is, the detection abnormality determination processing means determines whether first to third judgment conditions are met, based on whether the battery voltage VB is greater than a threshold value Vth11, and whether the generator inverter voltage VG is greater than the threshold value Vth11, and whether the drive motor inverter voltage VM is less than or equal to a threshold value Vth12. If the first to third judgment conditions are met, the detection abnormality determination processing means determines that the drive motor inverter sensor 76 has a broken wire.

If at least one of the first to third judgment conditions is not met, that is, if the battery voltage VB is less than or equal to the threshold value or the generator inverter voltage VG is less than or equal to than the threshold value Vth11 or the drive motor inverter voltage VM is greater than the threshold value Vth12, the detection abnormality determination processing means determines whether fourth to sixth judgment conditions are met, based on whether the battery voltage VB is less than or equal to the threshold value Vth12, and whether the generator inverter voltage VG is less than or equal to the threshold value Vth12, and whether the drive motor inverter voltage VM is higher than the threshold value Vth11. If the fourth to sixth judgment conditions are met, the detection abnormality determination processing means determines that the drive motor inverter sensor 76 has a short circuit. If at least one of the fourth to sixth judgment conditions is not met, that is, if the battery voltage VB is greater than the threshold value Vth12 or the generator inverter voltage VG is higher than the threshold value Vth12 or the drive motor inverter voltage VM is less than or equal to the threshold value Vth11, the detection abnormality determination processing means determines that the battery voltage sensor 72, the generator inverter sensor 75 and the drive motor inverter sensor 76 are normal. Although in this embodiment, the threshold value Vth12 is set less than the threshold value Vth11, the threshold values Vth11 and Vth12 may be equal to each other.

Then, if it is determined that the drive motor inverter sensor 76 has a broken wire, or if it is determined that the drive motor inverter sensor 76 has a short circuit, the system voltage determination processing means 91 sets the battery voltage VB or the generator inverter voltage VG as a system voltage Vsys. If it is determined that the battery voltage sensor 72, the generator inverter sensor 75 and the drive motor inverter sensor 76 are all normal, the system voltage determination processing means 91 sets the battery voltage VB, the generator inverter voltage VG or the drive motor inverter voltage VM as a system voltage Vsys.

In this embodiment, in order to determine whether the drive motor inverter sensor 76 has a broken wire or has a short circuit, it is determined whether the battery voltage VB is greater than the threshold value Vth11, and whether the generator inverter voltage VG is greater than the threshold value Vth11, and whether the drive motor inverter voltage VM is less than or equal to the threshold value Vth12, and it is also determined whether the battery voltage VB is less than or equal to the threshold value Vth12, and whether the generator inverter voltage VG is less than or equal to the threshold value Vth12, and whether the drive motor inverter voltage VM is greater than the threshold value Vth11. It is also possible to determine whether the battery voltage sensor 72 and the generator inverter sensor 75 have a broken wire or a short circuit in a similar manner.

For example, for the determination as to whether the battery voltage sensor 72 has a broken line or a short circuit, it is determined whether the generator inverter voltage VG is greater than the threshold value Vth11, and the drive motor inverter voltage VM is greater than the threshold value Vth11, and whether the battery voltage VB is less than or equal to Vth12, and it is also determined whether the drive motor inverter voltage VM is less than or equal to the threshold value Vth12, and whether the generator inverter voltage VG is less than or equal to the threshold value Vth12, and the battery voltage VB is higher than the threshold value Vth11. For the determination as to whether the generator inverter sensor 75 has a broken line or a short circuit, it is determined whether the battery voltage VB is greater than the threshold value Vth11, and whether the drive motor inverter voltage VM is greater than the threshold value Vth11, and whether the generator inverter voltage VG is less than or equal to the threshold value Vth12, and it is determined whether the battery voltage VB is less than or equal to the threshold value Vth12, and whether the drive motor inverter voltage VM is less than or equal to the threshold value Vth12, and whether the generator inverter voltage VG is greater than the threshold value Vth11.

Thus, it is possible to determine whether any one of the battery voltage sensor 72, the generator inverter sensor 75 and the drive motor inverter sensor 76 has a detection abnormality due to a broken wire or a short circuit, based on the battery voltage VB, the generator inverter voltage VG and the drive motor inverter voltage VM, that is, based on a result of comparison of two of the battery voltage VB, the generator inverter voltage VG and the drive motor inverter voltage VM with a threshold value, and a result of comparison of the other one of them with a threshold. Therefore, it is possible to determine a system voltage Vsys based on voltages of the battery voltage VB, the generator inverter voltage VG and the drive motor inverter voltage VM that do not have a detection abnormality. Hence, it is possible to smoothly perform various drive controls, such as the torque control of the generator 16, the rotation speed control of the generator 16, the torque control of the drive motor 25, etc.

Next, the flowchart will be described.

Step S1-11: The battery voltage VB, the generator inverter voltage VG and the drive motor inverter voltage VM are read.

Step S1-12: It is determined whether the battery voltage VB is greater than the threshold value Vth11, and the generator inverter voltage VG is greater than the threshold value Vth11, and the drive motor inverter voltage VM is less than or equal to the threshold value Vth12. If the battery voltage VB is greater than the threshold value Vth11 and the generator inverter voltage VG is greater than the threshold value Vth11 and the drive motor inverter voltage VM is less than or equal to the threshold value Vth12, the process proceeds to step S13, if the battery voltage VB is less than or equal to than the threshold value Vth11, or if the generator inverter voltage VG is less than or equal to than the threshold value Vth11, or if the drive motor inverter voltage VM is greater than the threshold value Vth12, the process proceeds to step S15.

Step S1-15: It is determined whether the battery voltage VB is less than or equal to the threshold value Vth12, and the generator inverter voltage VG is less than or equal to the threshold value Vth12, and the drive motor inverter voltage VM is greater than the Vth11. If the battery voltage VB is less than or equal to the threshold value Vth12 and the battery voltage VB is less than or equal to the threshold value Vth12 and the drive motor inverter voltage VM is greater than the threshold value Vth11, the process proceeds to step S1-16. If the battery voltage VB is greater than the threshold value Vth12, or if the generator inverter voltage VG is greater than the threshold value Vth12, or if the drive motor inverter voltage VM is less than or equal to the threshold value Vth11, the process proceeds to step S1-18.

Step S1-16: It is determined that the drive motor inverter sensor 76 has a short circuit.

Step S1-17: The battery voltage VB or the generator inverter voltage VG is set as a system voltage Vsys. After that, the process ends.

Step S1-18: The battery voltage VB, the generator inverter voltage VG and the drive motor inverter voltage VM is set as a system voltage Vsys. After that, the process ends.

Although in this embodiment, the generator torque TG is restricted if the system voltage Vsys is high, it is also possible to restrict the drive motor torque TM in that case.

The invention is not limited to the foregoing embodiments, but may be modified in various manners based on the sprit of the invention. Such modifications are not excluded from the scope of the invention.

As described in detail above, in various exemplary embodiments according to the invention, the hybrid type vehicle drive control apparatus includes an electric generator that generates an electric power by driving an engine; an electric generator inverter for driving the electric generator; a drive motor that drives a hybrid type vehicle; a drive motor inverter for driving the drive motor; a battery connected to the electric generator inverter and the drive motor inverter; first voltage detection means for detecting a voltage applied to the electric generator inverter; second voltage detection means for detecting a voltage applied to the drive motor inverter; third voltage detection means for detecting a battery voltage; and system voltage determination processing means for determining a system voltage based on detection results provided by the first to third voltage detection means.

In these exemplary embodiments, if any one of the voltage information pieces from any one of the first to third voltage detection means has a detection abnormality, it is possible to determine the system voltage based on the detection results provided by the first to third voltage detection means. Therefore, the apparatus is able to smoothly perform various drive controls such as the torque control of the electric generator, the rotation speed control of the generator, the torque control of the drive motor, etc.

In another exemplary embodiment of a hybrid type vehicle drive control apparatus in accordance with the invention, the system voltage determination processing means determines the system voltage based on a difference between detection results provided by two voltage detection means of the first to third voltage detection means.

In this apparatus, on the basis of the difference between the detection results provided by two voltage detection means of the first to third voltage detection means, it is possible to that the detection result provided by the other one of the first to third voltage detection means is abnormal.

In a still another exemplary embodiment of a hybrid type vehicle drive control apparatus in accordance with the invention, the system voltage determination processing means determines the system voltage based on the detection result provided by each of the first to third voltage detection means.

In this apparatus, on the basis of the detection result provided by each of the first to third voltage detection means, it is possible to determine whether a predetermined one of the voltage detection means has a broken wire or a short circuit.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A hybrid type vehicle drive control apparatus, comprising:
    an electric generator that generates electric power by driving an engine;
    an electric generator inverter that drives the electric generator;
    a drive motor that drives a hybrid type vehicle;
    a drive motor inverter that drives the drive motor;
    a battery connected to the electric generator inverter and the drive motor inverter;
    a first voltage detection device that detects a voltage applied to the electric generator inverter;
    a second voltage detection device that detects a voltage applied to the drive motor inverter;
    a third voltage detection device that detects a battery voltage; and
    a system voltage determination processing device that determines a system voltage based on detection results provided by normal voltages of the first to third voltage detection devices if a detection abnormality occurs in any one of the first to third voltage detection devices.

2. The hybrid type vehicle drive control apparatus according to claim 1, wherein the system voltage determination processing device determines the system voltage based on a difference between two detection results of the detection results provided by the first to third voltage detection devices.

3. The hybrid type vehicle drive control apparatus according to claim 2, further comprising a planetary gear unit having at least first to third gear elements, wherein the first gear element is mechanically connected to the electric generator, and the second gear element is mechanically connected to the drive motor, and the third gear element is mechanically connected to the engine.

4. The hybrid type vehicle drive control apparatus according to claim 1, wherein the system voltage determination processing device determines the system voltage based on the detection result provided by each of the first to third voltage detection devices.

5. The hybrid type vehicle drive control apparatus according to claim 4, wherein the system voltage determination processing device determines the system voltage based on detection results provided by two of the first to third voltage detection devices, and a detection result provided by another one of the first to third voltage detection devices.

6. The hybrid type vehicle drive control apparatus according to claim 5, further comprising a planetary gear unit having at least first to third gear elements, the first element is mechanically connected to the electric generator, and the second gear element is mechanically connected to the drive motor, and the third gear element is mechanically connected to the engine.

7. The hybrid type vehicle drive control apparatus according to claim 4, further comprising a planetary gear unit having at least first to third gear elements, wherein the first gear element is mechanically connected to the electric generator, and the second gear element is mechanically connected to the drive motor, and the third gear element is mechanically connected to the engine.

8. The hybrid type vehicle drive control apparatus according to claim 1, further comprising a planetary gear unit having at least first to third gear elements, wherein the first gear element is mechanically connected to the electric generator, and the second gear element is mechanically connected to the drive motor, and the third gear element is mechanically connected to the engine.

9. The hybrid type vehicle drive control apparatus according to claim 1, wherein the system voltage determination processing device determines the normal voltages based on a difference between two detection results of the detection results provided by the first to third voltage detection devices and a difference between one of the two detection results and another detection result of the detection results provided by the first to third voltage detection devices.

10. A method for controlling a hybrid type vehicle drive apparatus having an electric generator that generates electric power by driving an engine, an electric generator inverter that drives the electric generator, a drive motor that drives a hybrid type vehicle, a drive motor inverter that drives the drive motor, and a battery connected to the electric generator inverter and the drive motor inverter, the method comprising:
    detecting a voltage applied to the electric generator inverter by a first voltage detection device;
    detecting a voltage applied to the drive motor inverter by a second voltage detection device;
    detecting a battery voltage by a third voltage detection device; and
    determining a system voltage based on detection results provided by the first to third voltage detection devices.

11. The method according to claim 10, wherein determining a system voltage is based on a difference between two detection results of the detection results provided by the first to third voltage detection devices.

12. The method according to claim 10, wherein determining a system voltage is based on the detection result provided by each of the first to third voltage detection devices.

13. The method according to claim 12, wherein determining a system voltage is based on detection results provided by two of the first to third voltage detection devices, and a detection result provided by another one of the first to third voltage detection devices.

14. A machine-readable medium that provides instructions for processing information, instructions that, when executed by a processor, cause the processor to perform operations comprising:
    detecting a voltage applied to an electric generator inverter by a first voltage detection device;

detecting a voltage applied to a drive motor inverter by a second voltage detection device;

detecting a battery voltage by a third voltage detection device; and determining a system voltage based on detection results provided by the first to third voltage detection devices.

15. The machine-readable medium according to claim 14, wherein determining a system voltage is based on a difference between two detection results of the detection results provided by the first to third voltage detection devices.

16. The machine-readable medium according to claim 14, wherein determining a system voltage is based on the detection result provided by each of the first to third voltage detection devices.

17. The machine-readable medium according to claim 16, wherein determining a system voltage is based on detection results provided by two of the first to third voltage detection devices, and a detection result provided by another one of the first to third voltage detection devices.

* * * * *